US011393123B2

United States Patent
Higo et al.

(10) Patent No.: US 11,393,123 B2
(45) Date of Patent: Jul. 19, 2022

(54) INFORMATION PROCESSING DEVICE, CONTROL METHOD THEREFOR, NON-TRANSITORY COMPUTER-READABLE STORAGE MEDIUM, AND DRIVING CONTROL SYSTEM

(71) Applicant: CANON KABUSHIKI KAISHA, Tokyo (JP)

(72) Inventors: Tomoaki Higo, Kawasaki (JP); Daisuke Kotake, Yokohama (JP); Masahiro Suzuki, Kawasaki (JP); Nozomu Kasuya, Yokohama (JP); Makoto Tomioka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 16/921,389

(22) Filed: Jul. 6, 2020

(65) Prior Publication Data
US 2020/0334855 A1    Oct. 22, 2020

Related U.S. Application Data

(63) Continuation of application No. PCT/JP2018/041667, filed on Nov. 9, 2018.

(30) Foreign Application Priority Data

Jan. 15, 2018  (JP) .............................. JP2018-004469

(51) Int. Cl.
*G06T 7/73*     (2017.01)
*G06T 7/521*    (2017.01)
(Continued)

(52) U.S. Cl.
CPC .............. *G06T 7/74* (2017.01); *G06T 7/0002* (2013.01); *G06T 7/521* (2017.01); *G06T 7/60* (2013.01);
(Continued)

(58) Field of Classification Search
CPC ......... G06T 7/74; G06T 7/0002; G06T 7/521; G06T 7/60; G06T 7/85;
(Continued)

(56) References Cited

U.S. PATENT DOCUMENTS 8,837,779 B2   9/2014 Meier
8,942,418 B2   1/2015 Kurz et al.
(Continued)

FOREIGN PATENT DOCUMENTS

JP    H10-341458 A    12/1998
JP    2009-020014 A    1/2009
(Continued)

OTHER PUBLICATIONS

Keisuke Tateno, et al., "CNN-SLAM: Real-time dense monocular SLAM with learned depth prediction," IEEE Computer Society Conference on Computer Vision and Pattern Recognition (CVPR), 2017, pp. 1-10.

(Continued)

*Primary Examiner* — Chan S Park
*Assistant Examiner* — Daniel C Chang
(74) *Attorney, Agent, or Firm* — Venable LLP

(57) ABSTRACT

An information processing device finds a position/orientation of an image capturing unit including first and second cameras whose image capturing fields are partially overlapped, the information processing device comprises an input unit that inputs first and second images from the first and second cameras a holding unit holding a learning model; a first estimating unit that estimates first provisional geometric information from the first and second images; a second estimating unit that estimates second provisional geometric information on the basis of the first image and the learning model; a third estimating unit that estimates third provisional geometric information on the basis of the second (Continued)

image and the learning model; and a generating unit that, on the basis of the first, second, and third provisional geometric information, generates the position/orientation information of the image capturing unit.

21 Claims, 19 Drawing Sheets

(51) Int. Cl.
G06T 7/80 (2017.01)
G06T 7/00 (2017.01)
G06T 7/60 (2017.01)

(52) U.S. Cl.
CPC ...... *G06T 7/85* (2017.01); *G06T 2207/10012* (2013.01); *G06T 2207/10048* (2013.01); *G06T 2207/20081* (2013.01); *G06T 2207/30168* (2013.01); *G06T 2207/30244* (2013.01); *G06T 2207/30252* (2013.01)

(58) Field of Classification Search
CPC . G06T 2207/10012; G06T 2207/10048; G06T 2207/20081; G06T 2207/30168; G06T 2207/30244; G06T 2207/30252; G06T 7/80; G06T 2207/20084; G06T 7/73
See application file for complete search history.

(56) References Cited

U.S. PATENT DOCUMENTS

| 9,218,665 | B2 | 12/2015 | Meier |
| 9,254,846 | B2 | 2/2016 | Dolgov et al. |
| 9,299,153 | B2 | 3/2016 | Aoki |
| 9,381,917 | B1 | 7/2016 | Dolgov et al. |
| 9,561,797 | B2 | 2/2017 | Dolgov et al. |
| 9,940,729 | B1* | 4/2018 | Kwant .................... G06T 7/579 |
| 10,062,169 | B2 | 8/2018 | Kurz et al. |
| 10,229,511 | B2 | 3/2019 | Meier |
| 10,580,162 | B2 | 3/2020 | Meier |
| 10,650,546 | B2 | 5/2020 | Kurz et al. |
| 2012/0033071 | A1* | 2/2012 | Kobayashi ............. G01B 11/25 348/139 |
| 2012/0219188 | A1 | 8/2012 | Kurz et al. |
| 2012/0224069 | A1 | 9/2012 | Aoki |
| 2012/0237085 | A1 | 9/2012 | Meier |
| 2014/0321708 | A1 | 10/2014 | Meier |
| 2014/0330479 | A1 | 11/2014 | Dolgov et al. |
| 2015/0092987 | A1 | 4/2015 | Kurz et al. |
| 2016/0189384 | A1 | 6/2016 | Meier |
| 2016/0214607 | A1 | 7/2016 | Dolgov et al. |
| 2016/0272207 | A1 | 9/2016 | Dolgov et al. |
| 2018/0357786 | A1 | 12/2018 | Kurz et al. |
| 2019/0172220 | A1 | 6/2019 | Meier |
| 2020/0175717 | A1* | 6/2020 | Tomioka .................. G06T 7/55 |

FOREIGN PATENT DOCUMENTS

| JP | 2012-058188 A | 3/2012 | |
| JP | 2012-134670 A | 7/2012 | |
| JP | 2015-084229 A | 4/2015 | |
| JP | 2015-203680 A | 11/2015 | |
| JP | 2017-202828 A | 11/2017 | |
| JP | 2017-204145 A | 11/2017 | |
| JP | 6426753 B2 * | 11/2018 | ............... G01C 3/06 |

OTHER PUBLICATIONS

Jakob Engel, et al., "LSD-SLAM: Large-Scale Direct Monocular SLAM," European Conference on Computer Vision (ECCV), 2014, pp. 1-16.

Feb. 12, 2019 International Search Report in International Patent Appln. No. PCT/JP2018/041667.

* cited by examiner

INFORMATION PROCESSING DEVICE, CONTROL METHOD THEREFOR, NON-TRANSITORY COMPUTER-READABLE STORAGE MEDIUM, AND DRIVING CONTROL SYSTEM

CROSS-REFERENCE TO RELATED APPLICATIONS

This application is a Continuation of International Patent Application No. PCT/JP2018/041667, filed Nov. 9, 2018, which claims the benefit of Japanese Patent Application No. 2018-004469, filed Jan. 15, 2018, both of which are hereby incorporated by reference herein in their entirety.

BACKGROUND OF THE INVENTION

Field of the Invention

The present invention relates to an information processing device, a control method therefor, a computer-readable storage medium, and a driving control system.

Background Art

Techniques which measure the position/orientation of an image capturing device on the basis of image information are used for a variety of purposes, such as for automobiles and robots to estimate their own positions, aligning virtual objects with real spaces in mixed reality/augmented reality, and three-dimensional modeling of objects, spaces, and the like.

PTL 1 discloses a technique for estimating a self position/orientation by using a stereo camera to measure landmarks precisely. Additionally, NPTL 1 discloses a technique which estimates a self position by using a model pre-trained through deep learning to estimate the depth of a scene, using only a monocular camera.

However, more stable position/orientation estimation than that provided by the methods of PTL 1, NPTL 1, and the like are needed when implementing the techniques as modules for self-position estimation in autonomous driving, driving assistance, and the like for automobiles.

Having been achieved in light of the foregoing issues, the present invention attempts to provide a technique for more stably estimating a position/orientation.

CITATION LIST

Patent Literature

PTL 1: Japanese Patent Laid-Open No. 2009-20014

Non Patent Literature

NPTL 1: K. Tateno, F. Tombari, I. Laina and N. Navab, "CNN-SLAM: Real-time dense monocular SLAM with learned depth prediction", IEEE Computer Society Conference on Computer Vision and Pattern Recognition (CVPR), 2017.
NPTL 2: J. Engel, T. Schöps, and D. Cremers. "LSD-SLAM: Large-Scale Direct Monocular SLAM", In European Conference on Computer Vision (ECCV), 2014.

SUMMARY OF THE INVENTION

According to an aspect of the invention, there is provided an information processing device that, on the basis of an image from an image capturing unit including a first image capturing device and a second image capturing device disposed so that image capturing visual fields of the image capturing devices at least partially overlap, finds a position/orientation of the image capturing unit or geometric information expressed by a captured image, the information processing device comprising:

an input unit that inputs, from the image capturing unit, a first image obtained by the first image capturing device and a second image obtained by the second image capturing device;

a holding unit that holds a learning model for estimating the geometric information expressed by a provided image;

a first estimating unit that estimates first provisional geometric information from the first image and the second image;

a second estimating unit that estimates second provisional geometric information on the basis of the first image and the learning model held in the holding unit;

a third estimating unit that estimates third provisional geometric information on the basis of the second image and the learning model held in the holding unit; and a generating unit that, on the basis of at least one of the first, second, and third provisional geometric information, generates at least one of position/orientation information of the image capturing unit and geometric information expressed by the image captured by the image capturing unit.

Further features of the present invention will become apparent from the following description of exemplary embodiments with reference to the attached drawings.

DESCRIPTION OF THE EMBODIMENTS

An information processing device according to embodiments of the present invention will be described in detail hereinafter.

Several terms used herein will be defined before describing the embodiments.

"Geometric information" refers to a three-dimensional shape of a scene which has been captured, and is expressed as a range image which holds a range value for each of pixels in an image. As long as the information is range information which makes it possible to express three-dimensional positions, a range image does not absolutely need to be formed, and a three-dimensional point group, such as a point cloud, which expresses each pixel of the range image with X, Y, and Z coordinate values may be used.

"Position/orientation" is expressed by a total of six parameters, including three degree of freedom parameters expressing position and three degree of freedom parameters expressing orientation. In the embodiments, this refers mainly to the position/orientation of an image capturing device, but also indirectly expresses the position/orientation of a vehicle on which the device is mounted.

"Learning model" refers to a model trained in advance on a plurality of images and corresponding range images projected onto those images at the same times and same visual fields, so that a range image corresponding to an input image can be estimated. The learning model is assumed to be a model which takes images as inputs and outputs, such as a CNN (Convolutional Neural Network). However, the learning model is not limited thereto, and may be a model that takes an image as an input and outputs geometric information such as a three-dimensional point group.

"Problem" (or "impropriety") refers to a state in which the estimated geometric information or position/orientation differs greatly from the ideal geometric information or position/orientation. A variety of factors are conceivable as factors which produce a problem, such as image noise produced by the image capturing device or the environment of the captured scene, estimating geometric information using a learning model which has been trained on an insufficient number of scenes, calibration parameters differing from actual parameters, or the image capturing device itself malfunctioning.

"Abnormality" refers to a state which is different from a normal state, such as a malfunction in the image capturing device or a lens of the image capturing device being damaged or soiled. In a broad sense, a "problem" may also be referred to as an "abnormality".

First Embodiment

Figure 1:
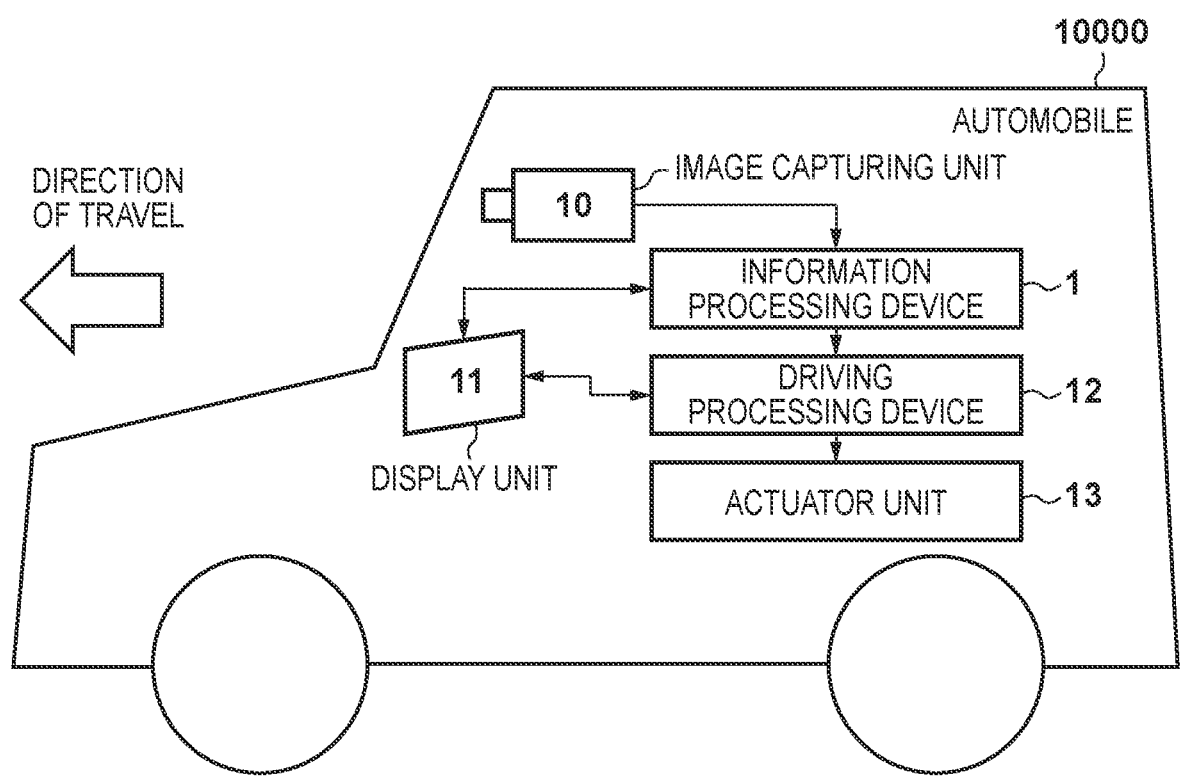
FIG. 1 is a diagram illustrating the configuration of an automobile according to a first embodiment.

A first embodiment will describe an example in which an information processing device estimates a self-position of a vehicle body for the purpose of autonomous driving or driving assistance for a vehicle. Although a plurality of types of sensor information are often used to stably find the position/orientation of an image capturing device attached to a vehicle body, in the present embodiment, a sensor having a stereo configuration which employs two image capturing devices is used to estimate three systems of provisional geometric information and three systems of provisional position/orientation information, and stable geometric information and position/orientation information are then found from the results of the estimation. FIG. 1 is a diagram illustrating the configuration of a driving control system of an automobile 10000 according to the present embodiment. In the present embodiment, autonomous driving or driving assistance is carried out by finding the position/orientation of an image capturing unit 10 attached to the automobile 10000 in a stable manner and then controlling driving in accordance with the position/orientation which have been found. To that end, geometric information of the periphery, the position/orientation of the image capturing unit 10, and so on are calculated using an information processing device 1. The calculated geometric information and position/orientation are supplied to a driving processing device 12. The driving processing device 12 controls the automobile 10000 by causing an actuator unit 13 to operate on the basis of the stated information. Note that the provisional geometric information is geometric information which serves as a candidate, a material, or a reference for the geometric information which is ultimately finalized.

Configuration of Information Processing Device

Figure 2:
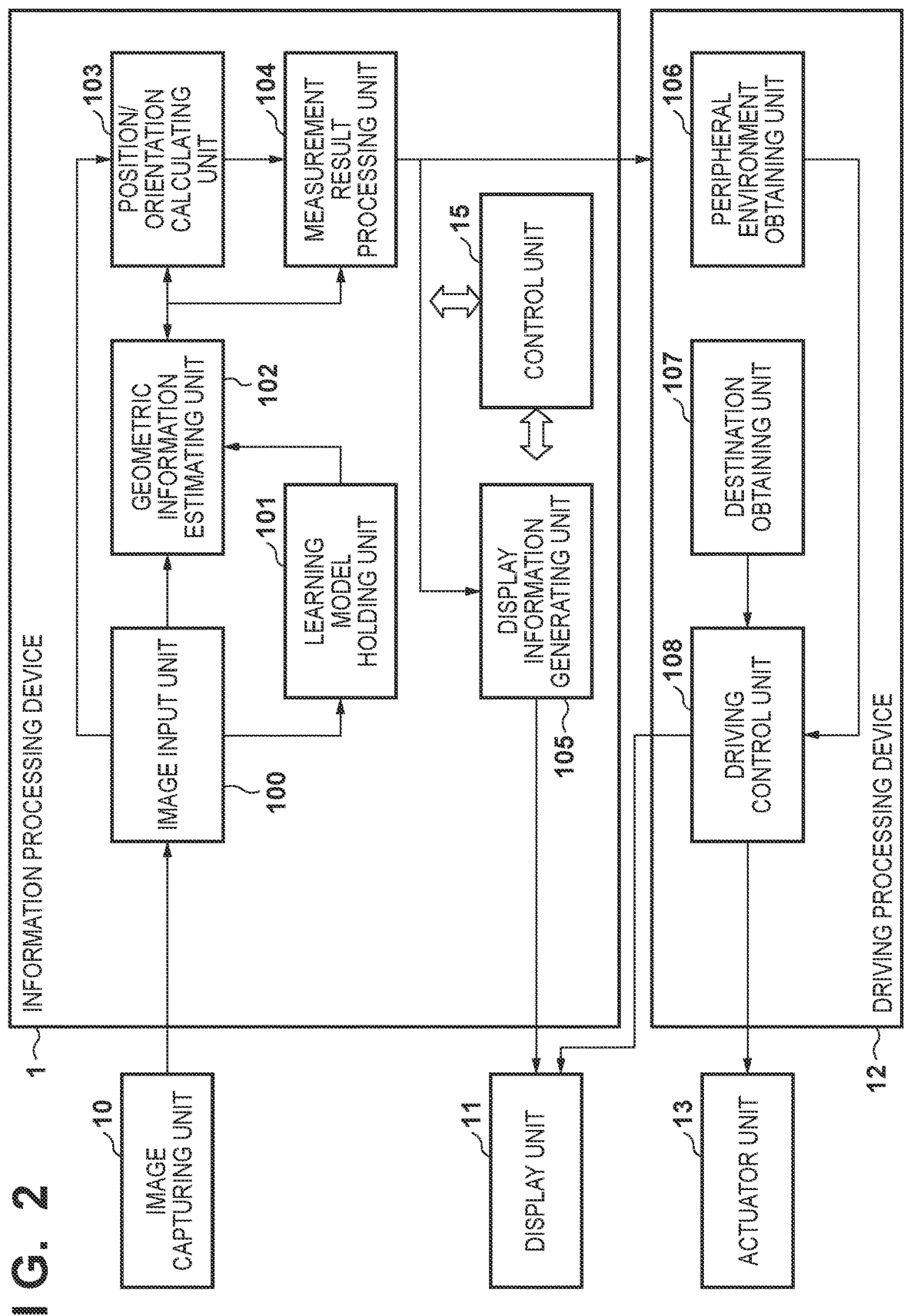
FIG. 2 is a diagram illustrating the functional configuration of an information processing device and a driving processing unit according to the first embodiment.

FIG. 2 is a block diagram primarily illustrating the information processing device 1 and the driving processing device 12 according to the present embodiment.

The information processing device 1 includes an image input unit 100, a learning model holding unit 101, a geometric information estimating unit 102, a position/orientation calculating unit 103, a measurement result processing unit 104, a display information generating unit 105, and a control unit 15 which controls the device as a whole. The control unit 15 is constituted by a CPU (a processor), as well as memory (ROM and RAM) for storing programs executed by the CPU and for use as a work area.

The driving processing device 12 includes a peripheral environment obtaining unit 106, a destination obtaining unit 107, and a driving control unit 108 that controls the driving processing device 12 as a whole. The driving control unit 108 is also constituted by a CPU, as well as memory (ROM and RAM) for storing programs and for use as a work area.

The image input unit 100 is connected to the image capturing unit 10 attached to the vehicle body. The display information generating unit 105 is connected to a display unit 11. The driving control unit 108 is connected to the actuator unit 13, which controls the torque, direction, and the like of wheels of the vehicle. However, FIG. 2 is merely an example, and is not intended to limit the applicable scope of the present invention.

The image capturing unit 10 is constituted by two image capturing devices for estimating geometric information through stereo based on triangulation. In other words, these two image capturing devices are disposed so that the optical axis directions thereof are parallel and the ranges of the respective image capturing visual fields largely overlap with each other. The image capturing devices are video cameras capable of capturing images of the peripheral environment of the vehicle in time series (e.g., at 60 fps), and capture images having three components, i.e., R, G, and B, for each pixel.

The image input unit 100 is input with the image data of two-dimensional images of scenes captured by each of the two image capturing devices of the image capturing unit 10 in time series, and supplies that image data to the learning model holding unit 101, the geometric information estimating unit 102, the position/orientation calculating unit 103, the display information generating unit 105, and the driving processing device 12. In the following, when specifying one of the two image capturing devices, the terms "first image capturing device" and "second image capturing device" will be used, and likewise, when specifying the images obtained by the respective image capturing devices, the terms "first image" and "second image" will be used.

The learning model holding unit 101 holds a learning model for estimating the geometric information from a single image. The geometric information estimating unit 102 uses calibration parameters held in a calibration parameter holding unit (not shown) to estimate first geometric information from the first image and the second image (a stereo image) through triangulation. Furthermore, the geometric information estimating unit 102 uses the learning model held in the learning model holding unit 101 to estimate second geometric information corresponding to the first image input from the image input unit 100. Likewise, the geometric information estimating unit 102 uses the learning model to estimate third geometric information corresponding to the second image. The geometric information estimating unit 102 then supplies the estimated first, second, and third geometric information to the position/orientation calculating unit 103.

The position/orientation calculating unit 103 calculates first, second, and third position and orientations of the image capturing unit 10 on the basis of the images input by the image input unit 100 and the first, second, and third geometric information, respectively, input from the geometric information estimating unit 102. The position/orientation calculating unit 103 then supplies the calculated first, second, and third position/orientations to the measurement result processing unit 104.

The measurement result processing unit 104 calculates a stable position/orientation on the basis of the first, second, and third position/orientations input from the position/orientation calculating unit 103. The calculation method will be described later. The measurement result processing unit 104 furthermore updates the geometric information found in the previous frame on the basis of the calculated position/orientation. In other words, the measurement result processing unit 104 generates (determines) a final current position/orientation and final current geometric information from the first, second, and third position/orientations calculated by the position/orientation calculating unit 103. The measurement result processing unit 104 then supplies the determined position/orientation and geometric information to the display information generating unit 105 and the driving processing device 12.

The display information generating unit 105 generates display information on the basis of the geometric information and position/orientation input from the measurement result processing unit 104. The display information generating unit 105 then outputs the generated display information to the display unit 11. The display unit 11 is a display mounted within the vehicle, and displays the display information input from the display information generating unit 105.

The driving processing device 12 controls the actuator unit 13, and generates and outputs the display information to the display unit 11, on the basis of the images input by the image input unit 100 and the geometric information and position/orientation received from the measurement result processing unit 104. This will be described in detail below.

The peripheral environment obtaining unit 106 obtains information indicating the peripheral environment of the vehicle body ("peripheral environment information" hereinafter) on the basis of the images input by the image input unit 100 and the geometric information and position/orientation input by the measurement result processing unit 104. The peripheral environment obtaining unit 106 then supplies the obtained peripheral environment information to the driving control unit 108.

The destination obtaining unit 107 obtains a destination of the vehicle from a user by using a user interface (not shown). The destination obtaining unit 107 then supplies information indicating the obtained destination to the driving control unit 108.

The driving control unit 108 calculates and outputs control values for the actuator unit 13, for the purpose of proceeding safely to the destination, on the basis of the peripheral environment information input by the peripheral environment obtaining unit 106 and the destination input by the destination obtaining unit 107. The driving control unit 108 also generates various types of information during travel to the destination, and outputs that information to the display unit 11. The actuator unit 13 controls/drives the movement of the vehicle in accordance with control values, signals, and the like received from the driving control unit 108.

Figure 3:
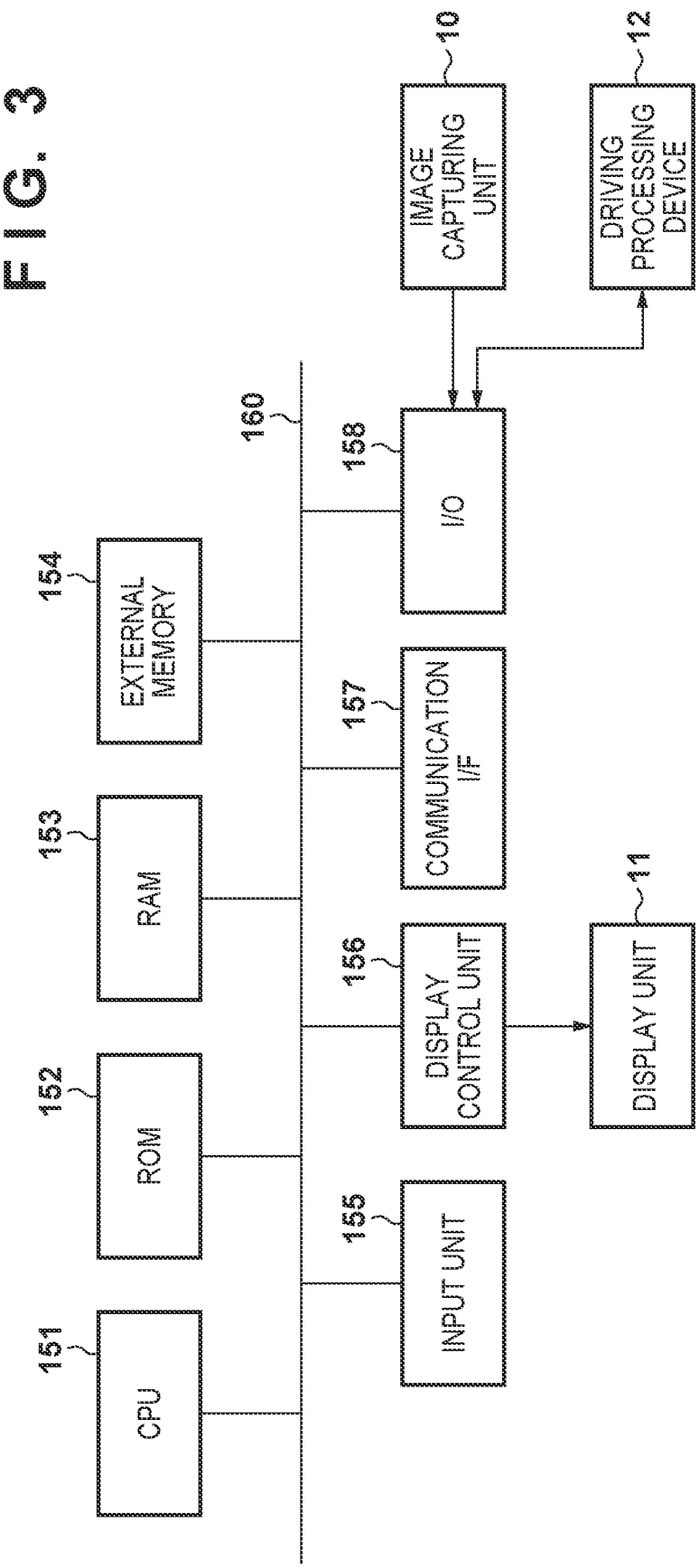
FIG. 3 is a hardware configuration of the information processing device according to the first embodiment.

FIG. 3 is a diagram illustrating the main hardware configuration of the information processing device 1. The information processing device 1 includes a CPU 151, ROM 152, RAM 153, external memory 154, an input unit 155, a display control unit 156, a communication I/F 157, an I/O 158, and a bus 160 that connects those elements. The ROM 152 stores BIOS (Basic Input/Output System) programs, a boot program, and the like. The RAM 153 is used as a main storage device for the CPU 151. The external memory 154 is a storage device which holds an OS (operating system) executed by the information processing device 1, application programs for the information processing device 1 to function as a driving support device, and the learning model, and is typically high-capacity non-volatile memory which can be written to, such as a hard disk device. The input unit 155 is a touch panel, a keyboard, a mouse, a robot controller, or the like, and carries out processing pertaining to the input of information and the like. The display control unit 156 generates various types of images, such as menus, to be displayed in the display unit 11, in response to instructions from the CPU 151, and outputs those images to the display unit 11. Note that the display unit 11 may be any type, such as a liquid crystal display device, a projector, or an LED indicator. The communication interface 157 communicates information over a network, and may be any type of communication interface, such as Ethernet, USB, serial communication, or wireless communication. The I/O 158 is an input/output unit (I/O) that connects the information processing device 1 to an external device, and in the embodiment, the image capturing unit 10 and the driving processing device 12 are connected.

In the above-described configuration, when the main power of the information processing device 1 is turned on, the OS is loaded from the external memory 154 into the RAM 153 and executed as a result of the CPU 151 executing the boot program stored in the ROM 152. Then, under the control of the OS, the CPU 151 loads a driving support application program into the RAM 153 from the external memory 154 and executes that program, and the information processing device 1 functions as a driving support device as a result. Although the learning model holding unit 101 illustrated in FIG. 2 is realized by the external memory 154, the other processing units are realized by the CPU 151 executing the above-described application. Note that some of the various processing units illustrated in FIG. 2 may be realized by hardware independent from the CPU 151.

As described earlier, the image capturing unit 10 is constituted by two image capturing devices. In the present embodiment, the position/orientation of the image capturing unit 10 are assumed to be expressed by six degree of freedom parameters in a coordinate system which takes the first image capturing device as a reference. The first image capturing device and the second image capturing device are fixed relative to each other, and the relative position/orientation of one of the image capturing devices is found in advance through calibration as calibration parameters, which are held in the calibration parameter holding unit (not shown). As such, calculating the position/orientation of one of the image capturing devices makes it possible to find the position/orientation of the other image capturing device. Although the position/orientation of the image capturing unit 10 is described here as being a coordinate system that takes the first image capturing device as a reference, the configuration is not limited thereto. The coordinate system may take the second image capturing device as a reference, and a reference coordinate system of the image capturing unit 10 may be set at a point different from the two image capturing devices. In this case, it is assumed that relative position/orientation conversion parameters for the respective image capturing devices are known from the reference coordinate system. It is also assumed that six degree of freedom parameters are also obtained in advance through calibration for the position/orientation relationship between the automobile 10000 and the image capturing unit 10. At this time, a reference coordinate system may be fixed to the automobile 10000. Accordingly, finding the position/orientation of the image capturing unit 10 is equivalent in meaning to finding the position/orientation of the automobile 10000. Additionally, the geometric information determined by the measurement result processing unit 104 described earlier is information taken from the perspective of the image capturing device which serves as a reference (the first image capturing device, in the embodiment).

Processing

Figure 4:
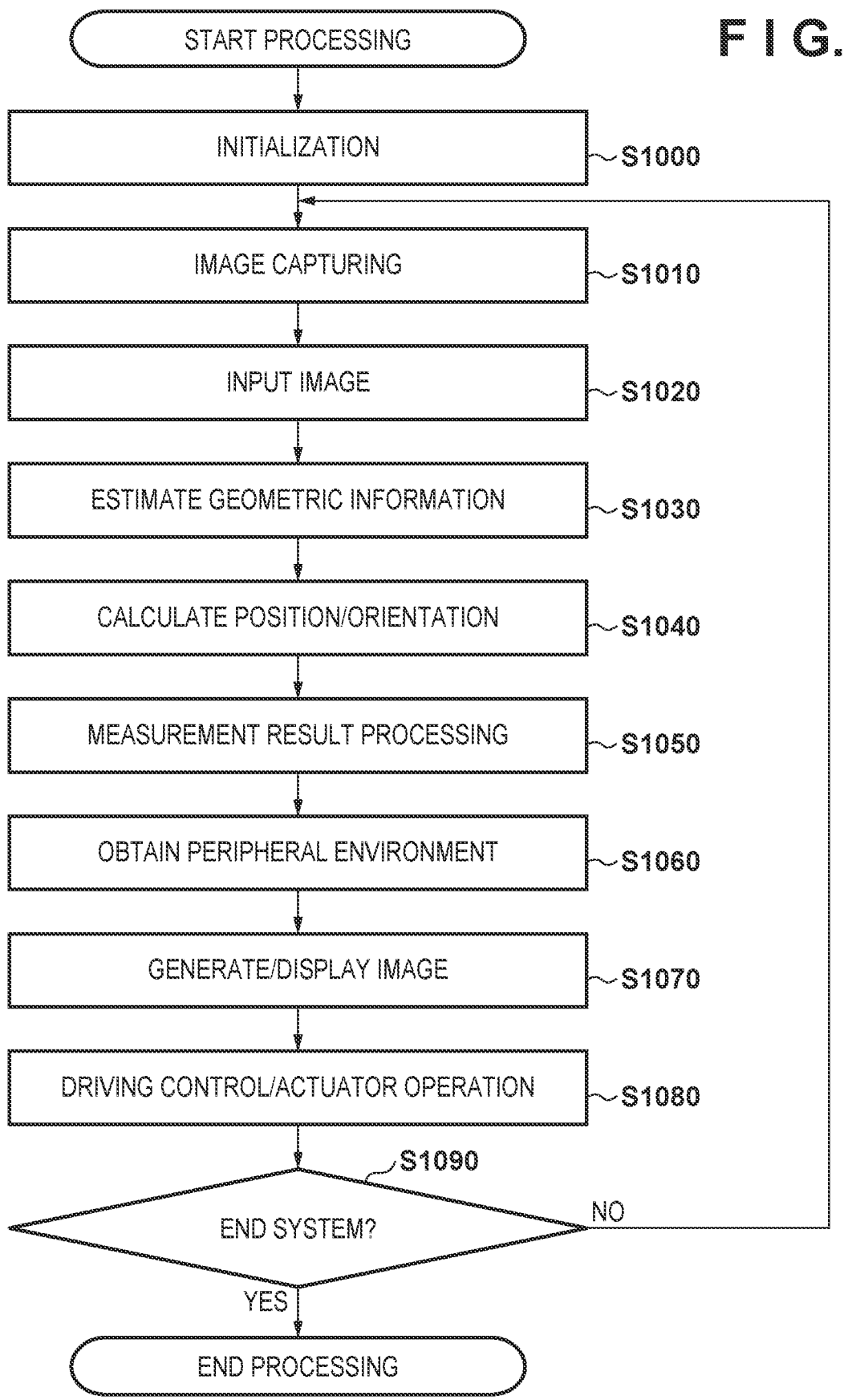
FIG. 4 is a flowchart illustrating a processing sequence carried out by an information processing system according to the first embodiment.

A processing sequence according to the present embodiment will be described next. FIG. 4 is a flowchart illustrating a processing sequence carried out by an information processing system including the information processing device 1 and the driving processing device 12 according to the present embodiment. In this drawing, steps S1000 to S1050 and S1090 indicate processing by the information processing device 1 (the control unit 15), whereas steps S1000 and S1060 to S1080 indicate processing by the driving processing device 12 (the driving control unit 108).

In step S1000, the control unit 15 initializes the system. In other words, the control unit 15 puts the information processing device 1 into a state in which the device can function as a device that supports driving, by loading the OS and application programs into the RAM 153 from the external memory 154 and executing those programs. Additionally, the control unit 15 loads the learning model held in the learning model holding unit 101 (the external memory 154) into the RAM 153. Furthermore, the control unit 15 starts up the devices connected to the information processing device 1 (the image capturing unit 10 and the like), loads parameters, and loads an initial position/orientation of the two image capturing devices included in the image capturing unit 10. Pre-calibrated parameters are used as internal parameters of the two image capturing devices (focal length, image center positions, lens distortion, and the like). Further still, the driving control unit 108 of the driving processing device 12 receives a destination set by the user from the destination obtaining unit 107, and sets that destination as the destination of the automobile 10000.

In step S1010, the control unit 15 controls the image capturing unit 10 to shoot a scene (an image) using the first and second image capturing devices. In step S1020, the control unit 15 controls the image input unit 100 to obtain the first image and the second image, which are the scenes captured by the first image capturing device and the second image capturing device, respectively.

In step S1030, the control unit 15 controls the geometric information estimating unit 102 to estimate (generate) the first, second, and third geometric information on the basis of the first image and the second image. The geometric information estimating unit 102 generates the first geometric information from the two images using a stereo method. Specifically, the geometric information estimating unit 102 calculates a parallax image by finding a correspondence relationship between the first image and the second image, and estimates a range image by carrying out triangulation on the basis of known calibration information between the two image capturing devices. The geometric information estimating unit 102 also estimates the second geometric information by inputting the first image to the learning model. Likewise, the geometric information estimating unit 102 estimates the third geometric information by inputting the second image to the learning model.

In step S1040, the control unit 15 controls the position/orientation calculating unit 103 to calculate the position/orientation of the image capturing unit 10 using the first, second, and third geometric information calculated in step S1030. The calculated position/orientations are the three first, second, and third position/orientations found from the first, second, and third geometric information, respectively. Specifically, the position/orientation calculating unit 103 projects each pixel in the image of the previous frame onto the current frame on the basis of the first geometric information. Next, the position/orientation calculating unit 103 obtains a first position/orientation by finding the position/orientation using the method of Engel et al (NPTL 2) so that a luminance difference between the pixel values of the projected pixels in the previous frame and the pixel values in the current frame is a minimum. The position/orientation calculating unit 103 obtains a second position/orientation and a third position/orientation by carrying out the same processing for the second and third geometric information as well. The position/orientation calculating unit 103 may furthermore update the corresponding geometric information after calculating the position/orientation. Specifically, the position/orientation calculating unit 103 takes the first, second, and third geometric information as geometric information at a current time t, on the basis of the first, second, and third position/orientations which have been found, and updates the geometric information through time-series filtering from a past time t-i (described in NPTL 1).

In step S1050, the control unit 15 controls the measurement result processing unit 104 to calculate a final position/orientation of the image capturing unit 10 on the basis of the first, second, and third position/orientations calculated in step S1040. The specific processing will be described later. The control unit 15 also updates the geometric information on the basis of the position/orientation which has been found.

In step S1060, the driving control unit 108 controls the peripheral environment obtaining unit 106 to obtain a peripheral environment map on the basis of the position/orientation calculated in step S1050, the updated geometric information, the first image, and the second image. The "peripheral environment map" is a map expressing where roads, vehicles, buildings, and the like are present in a three-dimensional space. The peripheral environment obtaining unit 106 identifies roads, vehicles, buildings, and the like from the geometric information and semantic region division carried out on the first image and the second image. The peripheral environment obtaining unit 106 updates the peripheral environment map using the geometric information and the semantic region division result, in accordance with the position/orientation calculated on the peripheral environment map obtained up to the previous frame.

In step S1070, the driving control unit 108 controls the display information generating unit 105 to generate display information, in which information required by the user has been added to an image obtained by rendering the peripheral environment from a designated viewpoint, as an image, on the basis of the peripheral environment map found in step S1060. The driving control unit 108 then causes the generated image to be displayed in the display of the display unit 11 so that the user can view the image. Here, the "information required by the user" is, for example, the position/orientation of the automobile 10000 relative to the peripheral environment, found from the peripheral environment map and the position/orientation.

In step S1080, the driving control unit 108 generates actuator control values on the basis of the position/orientation of the image capturing unit 10, the peripheral environment map, and the destination, for the vehicle to travel safely toward the destination. The driving control unit 108 then uses the generated actuator control values to control the actuator unit 13 and cause the vehicle to travel.

In step S1090, the control unit 15 determines whether or not to end the system. Specifically, if the user has entered an end command using an input unit (not shown), the system is ended, whereas if such is not the case, the sequence returns to step S1010 and the processing described above is repeated.

Figure 5:
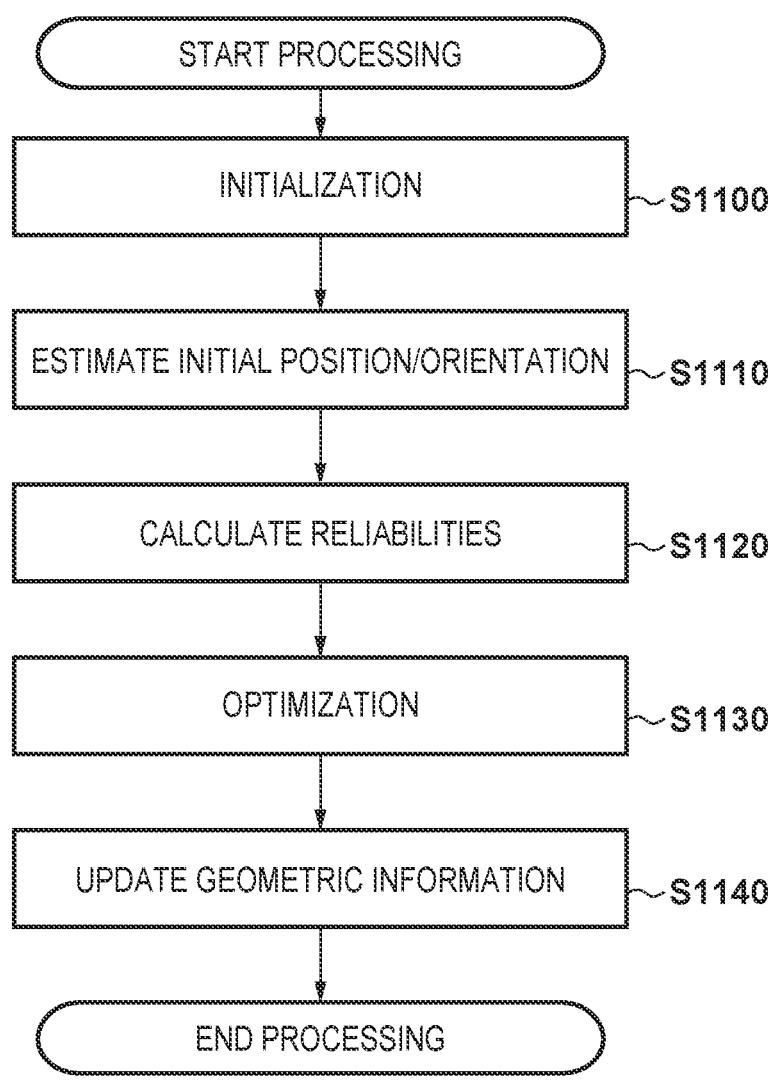
FIG. 5 is a flowchart illustrating a sequence for measurement result processing according to the first embodiment.

Processing by Measurement Result Processing Unit for Finding Position/Orientation FIG. 5 is a flowchart illustrating the processing of step S1050 according to the present embodiment, i.e., a sequence carried out by the measurement result processing unit 104. Details of the processing carried out by the measurement result processing unit 104 will be described hereinafter with reference to this drawing.

In step S1100, the measurement result processing unit 104 carries out initialization. In this initialization, the measurement result processing unit 104 loads the first, second, and third position/orientations, the image of the previous frame which will be necessary in the subsequent processing, the geometric information of the peripheral environment map, parameters used when solving optimization problems, and the like.

In step S1110, on the basis of the position/orientation in the image one frame previous and the image two frames previous, the measurement result processing unit 104 estimates the position/orientation in the current frame through linear interpolation, and takes that position/orientation as an initial position/orientation. However, the initial position/orientation is not limited thereto, and the initial position/orientation may be found from an accelerometer, a GPS sensor, or the like.

In step S1120, the measurement result processing unit 104 calculates reliabilities pertaining to the first, second, and third position/orientations. The reliabilities express the extent to which the first, second, and third position/orientations can be trusted as numerical values. A higher reliability indicates a higher likelihood that the position/orientation has little error from the correct position/orientation. When the method of NPTL 2 is used as the method for finding the position/orientation in step S1040, the reliability is assumed to be expressed using a minimized luminance difference. In other words, it is assumed that a function is used in which the reliability is higher the lower the luminance difference mentioned here is.

However, the reliability is not limited to the luminance difference, and a reliability of geometric information obtained through the method of NPTL 1 when finding the corresponding geometric information, a degree of stereo matching, and the like may be used as the reliability, for example.

In step S1130, the measurement result processing unit 104 finds a position/orientation for final output, on the basis of the first, second, and third position/orientations, the reliabilities corresponding thereto, and the initial position/orientation. Here, assume that the first, second, and third position/orientations are represented by P1, P2, and P3, respectively; the initial position/orientation, by PI; the position/orientation output by the measurement result processing unit 104, by PO; and the reliabilities corresponding to the first, second, and third position/orientations, by c1, c2, and c3, respectively. Furthermore, a function f(Pi,Pj) is assumed to be a function that finds a difference between position/orientations Pi and Pj. PO is obtained by solving an optimization problem which minimizes the following Equation E.

$$E = k*f(PI,PO) + c1*f(P1,PO) + c2*f(P2,PO) + c3*f(P3,PO) \quad (1)$$

Here, k is an adjustment parameter. However, the method for finding PO is not limited to this method, and a true state PO may be found using a Kalman filter and taking PI, P1, P2, and P3 as inputs.

In step S1140, the measurement result processing unit 104 updates the geometric information on the basis of the position/orientation found in step S1130. Specifically, the first, second, and third geometric information are taken as geometric information at the current time t, on the basis of the position/orientation which has been found, and the geometric information is updated through time-series filtering, using the reliability with respect to the geometric information from the past time t-i as a weight (described in NPTL 1).

Although the processing of step S1120 is indicated as being carried out after step S1110 in the above-described flowchart, the flowchart is not absolutely limited to that order. The processing of step S1120 may be carried out first, and step S1110 may be carried out thereafter. The measurement result processing unit 104 finds the position/orientation and the geometric information through the processing described above.

Effects

According to the present first embodiment as described above, a plurality of pieces of geometric information and a plurality of position/orientations are estimated from a plurality of measurement systems. Each of the measurement results is processed independently after an image has been input, and thus even if a large amount of noise is present in one of the measurement results, that noise will have no effect on the other measurement results. It is therefore unlikely that a large amount of noise will be present in all of the plurality of measurement results, and the position/orientation can be estimated in a stable manner, even if some noise has slipped into the measurement result, by increasing the weighting of measurement results having little error with respect to the position/orientation estimated from time-series information. Furthermore, more accurate geometric information can be found by updating the geometric information on the basis of the stable position/orientation.

Variations

Although the first embodiment described an example in which processing is carried out according to the flowchart illustrated in FIG. 4, the processing is not limited thereto. An example of a functional configuration and a processing sequence according to a variation on the present embodiment will be described here. The example of the functional configuration according to the variation is the same as in the first embodiment and illustrated in FIG. 2, and thus only the geometric information estimating unit 102, the position/orientation calculating unit 103, and the measurement result processing unit 104, which are different, will be described.

As in the first embodiment described above, the geometric information estimating unit 102 estimates the first, second, and third geometric information and then outputs the estimated first, second, and third geometric information to the measurement result processing unit 104. Alternatively, the geometric information estimating unit 102 may first supply the first, second, and third geometric information to the position/orientation calculating unit 103, and then update the corresponding geometric information in accordance with calculation results of the first, second, and third position/orientations corresponding to the respective geometric information. Specifically, the first, second, and third geometric information are taken as geometric information at a current time t, on the basis of the first, second, and third position/orientations which have been found, and the geometric information is updated through time-series filtering from a past time t-i (described in NPTL 1).

The measurement result processing unit 104 calculates accurate geometric information on the basis of the first, second, and third geometric information updated by the geometric information estimating unit 102. The calculation method will be described later. The measurement result processing unit 104 outputs the calculated geometric information to the position/orientation calculating unit 103. Additionally, the measurement result processing unit 104 updates the geometric information on the basis of the position/orientation input by the position/orientation calculating unit 103, which will be described later. Furthermore, the measurement result processing unit 104 outputs the updated geometric information to the display information generating unit 105 and the driving processing device 12. Moreover, the measurement result processing unit 104 outputs the position/orientation to the display information generating unit 105 and the driving processing device 12.

The position/orientation calculating unit 103 calculates the position/orientation of the image capturing unit 10 on the basis of the image input by the image input unit 100 and the geometric information input by the measurement result processing unit 104. The calculated position/orientation is input to the measurement result processing unit 104.

Figure 6:
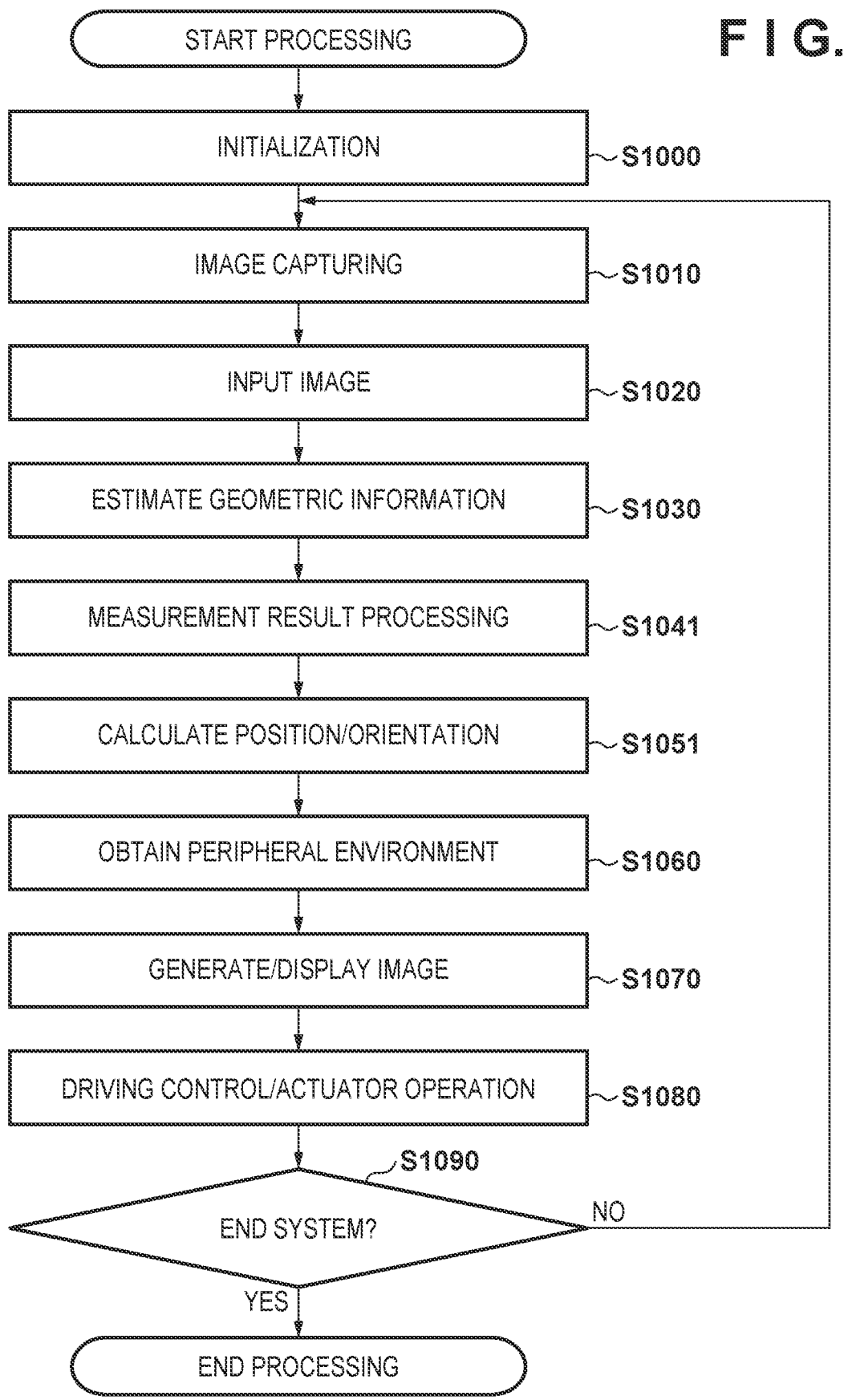
FIG. 6 is a flowchart illustrating a processing sequence according to a variation on the first embodiment.

The processing sequence according to the present variation will be described next. FIG. 6 is a flowchart illustrating a processing sequence carried out by an information processing system including the information processing device 1 according to the present variation. Many of the steps in this flowchart are the same as in the flowchart of FIG. 4, and thus only the different steps, namely step S1041 and step S1051, will be described.

In step S1041, the control unit 15 controls the measurement result processing unit 104 to calculate the geometric information of the captured scene using the first, second, and third geometric information calculated in step S1030. Specifically, the first, second, and third geometric information hold a reliability for each of measurement points or measurement regions, and the geometric information is configured so that three-dimensional points or planes are formed for points or regions having a high reliability. Details will be given later.

In step S1051, the control unit 15 controls the position/orientation calculating unit 103 to calculate the position/orientation of the image capturing unit 10 on the basis of the geometric information calculated in step S1041. Specifically, the position/orientation with respect to the peripheral environment map is calculated by aligning the geometric information calculated by the measurement result processing unit 104 with respect to the geometric information in the peripheral environment maps found in the frames thus far. Additionally, on the basis of the position/orientation in the image one frame previous and the image two frames previous, the position/orientation in the current frame is found through linear interpolation, and used as an initial position/orientation when carrying out alignment. The geometric information of the peripheral environment map is also updated by carrying out alignment.

Figure 7:
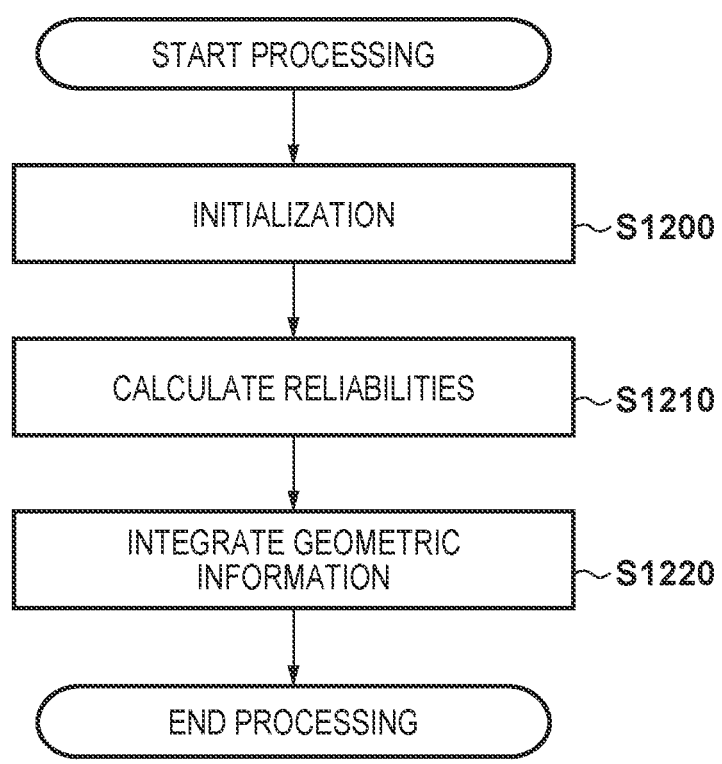
FIG. 7 is a flowchart illustrating a sequence for measurement result processing according to a variation on the first embodiment.

Processing by Measurement Result Processing Unit for Finding Geometric Information Here, FIG. 7 is a flowchart illustrating the processing sequence carried out by the measurement result processing unit 104 in step S1041 of FIG. 6.

In step S1200, the measurement result processing unit 104 carries out initialization processing. That is, the measurement result processing unit 104 loads the first, second, and third geometric information, the image of the previous frame which will be necessary in the subsequent processing, the geometric information of the peripheral environment map, parameters used when solving optimization problems, and the like.

In step S1210, the measurement result processing unit 104 calculates reliabilities pertaining to the first, second, and third geometric information, respectively. The reliabilities express the extent to which the first, second, and third geometric information can be trusted, at each of measurement points or each of measurement regions, as numerical values. A higher reliability indicates a higher likelihood that a three-dimensional position present at that measurement point or measurement region is correct. To find the reliability for the first geometric information, a degree of similarity is calculated for each of small regions when finding a correspondence relationship between the first image and the second image stereoscopically. A region having a higher degree of similarity is assumed to have a higher reliability. For the second and third geometric information, the reliabilities of the geometric information can be found through the method indicated in NPTL 1.

In step S1220, the measurement result processing unit 104 finds the geometric information to be output by the measurement result processing unit 104, on the basis of the first, second, and third geometric information and the reliabilities corresponding thereto. Specifically, the three pieces of geometric information are integrated by taking a weighted ICP (Iterative Closest Point), using the reliability at each measurement point or measurement region as a weight, and more correct geometric information is estimated as a result. When integrating the first, second, and third geometric information through ICP, the position/orientation of the geometric information found by the measurement result processing unit 104 for the image capturing unit 10 is found using a transformation matrix used to move and rotate the geometric information. The measurement result processing unit 104 finds the geometric information through the processing described above.

Although the measurement result processing unit 104 finds the position/orientation from a plurality of position/orientations in the first embodiment, the measurement result processing unit 104 may find the geometric information from a plurality of pieces of geometric information as described in the variation above.

Although only a single image input unit 100 is illustrated in FIG. 1, the configuration is not limited thereto; one image input unit may be provided for each of the two image capturing devices, or a single image input unit may receive images from two image capturing devices. Likewise, a plurality of the geometric information estimating unit 102, the position/orientation calculating unit 103, or the like may be provided. Furthermore, the learning model holding unit 101 may hold separate learning models for each of the two image capturing devices.

Although the display information generated by the display information generating unit 105 in step S1070 is described as being the position/orientation of the automobile 10000 relative to the peripheral environment, the display information is not limited thereto. For example, the display information may be an image captured by the image capturing unit 10, an image in which a result of the semantic region division, obtained from the peripheral environment map, is rendered on a two-dimensional image, and so on. The display information may be information such as a destination as well. Through this, the user can visually confirm the situation in the periphery of the automobile 10000 recognized by the information processing system.

The user entering a command to end in step S1090 was described as an example of a condition for ending the system. However, the condition is not limited thereto, and the user, who is the driver, changing from an autonomous driving mode in which the system controls the automobile to a driving mode in which the user drives the automobile may be used as the condition for ending the system. Additionally, the system may be ended when the driving processing device 12 has determined a situation where autonomous driving or driving assistance cannot be carried out, such as a mismatch between the obtained geometric information or position/orientation, and the destination.

The first embodiment described an example in which the position/orientation estimation is applied an application for autonomous driving or driving assistance for a vehicle. However, such applications are not the only items which can be applied to the information processing device 1 described in the present embodiment, and the present embodiment may be applied in any application or the like that uses a plurality of pieces of geometric information including results output by a learning model, or a position/orientation result. For example, the present embodiment may be used in a robot system that measures the position/orientation of a robot hand attached to a tip of an industrial robot arm. At this time, the robot system may include a manipulator such as a robot arm, a gripping device such as a suction hand, and a control unit that controls the manipulator or gripping device on the basis of the position/orientation calculated by the measurement result processing unit 104. The present embodiment may also be used for aligning a virtual object with a real space in a mixed reality system. At this time, the mixed reality system may include a head-mounted display provided with an image capturing device for capturing the peripheral environment. An interior cleaning robot, a drone that flies through the air, a device that travels underwater, and so on may hold the above-described learning model, estimate provisional geometric information based on the learning model, and estimate three-dimensional provisional geometric information using images from two image capturing devices. Furthermore, the geometric information or the position/orientation may be estimated and used by the robot itself to move, to capture the peripheral environment, and so on.

Additionally, the application for which the information processing device 1 is used is not limited to estimating a position/orientation, and may be three-dimensional reconstruction instead. For example, the device may be used as a measurement system for generating a CAD model for an industrial component, a building, or the like. At this time, the measurement system may further include a three-dimensional model generating unit that generates a three-dimensional model from the geometric information updated by the measurement result processing unit 104. Furthermore, the device may be used as a device that obtains a highly-accurate range image from a camera which cannot obtain a range image, such as an RGB camera or a camera that obtains a grayscale image.

The first embodiment described a configuration in which the on-board information processing device 1 includes the learning model holding unit 101, the geometric information estimating unit 102, the position/orientation calculating unit 103, and the measurement result processing unit 104. However, a cloud server may have some of the functions of the information processing device 1 described in the present embodiment, and may execute those functions. For example, the configuration may be such that a cloud server includes the learning model holding unit 101, the geometric information estimating unit 102, the position/orientation calculating unit 103, and the measurement result processing unit 104. According to this configuration, first, the information processing device 1 transfers the input image to the cloud server using a communication unit (not shown). Next, the geometric information is estimated using the learning model held in the learning model holding unit 101 on the cloud server. The geometric information estimating unit 102 also estimates a plurality of pieces of geometric information. The position/orientation calculating unit 103 then calculates a plurality of position/orientations, and the measurement result processing unit 104 finds a stable position/orientation and updates the geometric information. The cloud server then transfers the estimated geometric information and position/orientation to the information processing device 1 using the communication unit. Using such a configuration makes it possible to reduce the calculation load on the information processing device 1, which in turn makes it possible to use a small-scale computer and save space.

The present embodiment described a configuration in which the image capturing device which captures the image is an RGB video camera. However, the device is not limited to an RGB video camera, and may be any camera capable of capturing an image of a real space; for example, a camera which captures a grayscale image may be used, or a camera that can capture an infrared image, an ultraviolet image, a range image, three-dimensional point group data, or the like may be used. Additionally, although a stereo configuration constituted by two image capturing devices has been described, the configuration is not limited thereto, and a plurality of, i.e., three or more, cameras, a camera including a sensor, or the like may be used as well. In such a case, four or more pieces of geometric information or position/orientations can be calculated, and the measurement result processing unit 104 carries out calculations on the basis of the plurality of measurement results.

Second Embodiment

In the first embodiment, the measurement result processing unit 104 calculates more correct geometric information or a more correct position/orientation on the basis of a plurality of pieces of geometric information or position/orientations. However, in a second embodiment, the measurement result processing unit 104 makes a determination with respect to the geometric information or the position/orientation, and if the geometric information or the position/orientation has a problem, switches so that other geometric information or another position/orientation are used. As a result, autonomous driving or driving assistance is carried out using sensors that can obtain the optimal geometric information or position/orientation, and the optimal measurement results. The configuration of the automobile according to the present second embodiment is the same as that described in the first embodiment with reference to FIG. 1, and will therefore not be described here.

Configuration of Information Processing Device

An example of the functional configuration of an information processing device 1 according to the present embodiment is basically the same as that described in the first embodiment with reference to FIG. 2. The details of the processing carried out by the geometric information estimating unit 102, the position/orientation calculating unit 103, and the measurement result processing unit 104 are different. This will be described hereinafter. The first embodiment should be referred to for the other constituent elements.

As in the first embodiment, the geometric information estimating unit 102 has a function which can estimate the first, second, and third geometric information; the geometric information estimating unit 102 estimates one of the first, second, and third geometric information in accordance with parameters held in a parameter holding unit, which is not shown, and outputs the estimated information to the position/orientation calculating unit 103 and the measurement result processing unit 104. Here, the "parameters" specify which of the first, second, and third geometric information is to be used.

The position/orientation calculating unit 103 calculates the position/orientation of the image capturing unit 10 on the basis of the image input by the image input unit 100 and the geometric information input by the geometric information estimating unit 102. Furthermore, the position/orientation calculating unit 103 updates the geometric information on the basis of the calculated position/orientation. The position/orientation calculating unit 103 then supplies the calculated position/orientation and the updated geometric information to the measurement result processing unit 104.

The measurement result processing unit 104 determines whether or not there is a problem in the position/orientation input from the position/orientation calculating unit 103. If it is determined that there is no problem in the position/orientation, the measurement result processing unit 104 supplies the geometric information and the position/orientation to the display information generating unit 105 and the driving processing device 12. However, if it is determined that there is a problem in the position/orientation, the measurement result processing unit 104 updates the parameters in the parameter holding unit (not shown) and causes the geometric information estimating unit 102 to estimate different geometric information; the measurement result processing unit 104 furthermore causes the position/orientation calculating unit 103 to calculate a position/orientation on the basis of the newly-estimated geometric information, and repeats the determination as to whether or not there is a problem therein, and the information determined to not have a problem is set as the information to be output.

Processing

Figure 8:
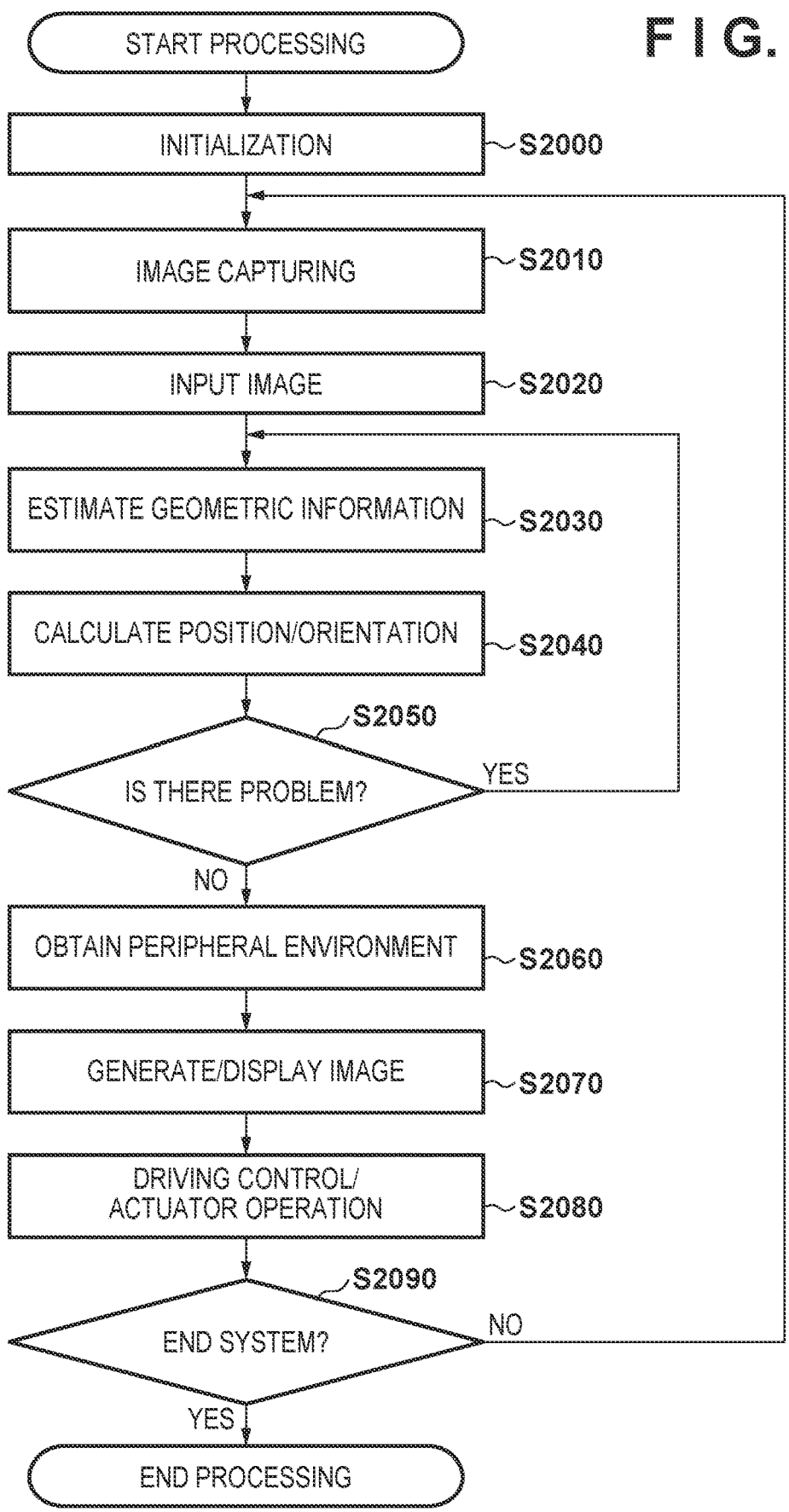
FIG. 8 is a flowchart illustrating a processing sequence carried out by an information processing system according to a second embodiment.

A processing sequence according to the present second embodiment will be described next. FIG. 8 is a flowchart illustrating a processing sequence carried out by an information processing system including the information processing device 1 according to the second embodiment.

The flowchart according to the present embodiment is basically the same as the flowchart described in the first embodiment with reference to FIG. 4. Step S2000, step S2010, step S2020, step S2060, step S2070, step S2080, and step S2090 have the same processing as step S1000, step S1010, step S1020, step S1060, step S1070, step S1080, and step S1090, respectively, and will therefore not be described; only step S2030, step S2040, and step S2050, which are different, will be described.

In step S2030, the control unit 15 controls the geometric information estimating unit 102 to estimate the geometric information, among the first, second, and third geometric information, which is to be specified, on the basis of the first image and the second image. Note that the method for finding each piece of the geometric information is the same as the processing described in step S1030.

In step S2040, the control unit 15 controls the position/orientation calculating unit 103 to calculate the position/orientation of the image capturing unit 10 using the geometric information calculated in step S2030. The position/orientation calculating unit 103 may furthermore update the corresponding geometric information after calculating the position/orientation.

In step S2050, the control unit 15 controls the measurement result processing unit 104 to determine whether or not there is a problem in the position/orientation calculated in step S2040. The sequence moves to step S2060 if there is no problem. However, if there is a problem, the sequence returns to step S2030 and starts over from the estimation of a different piece of geometric information. The specific processing for determining whether or not there is a problem will be described below.

Figure 9:
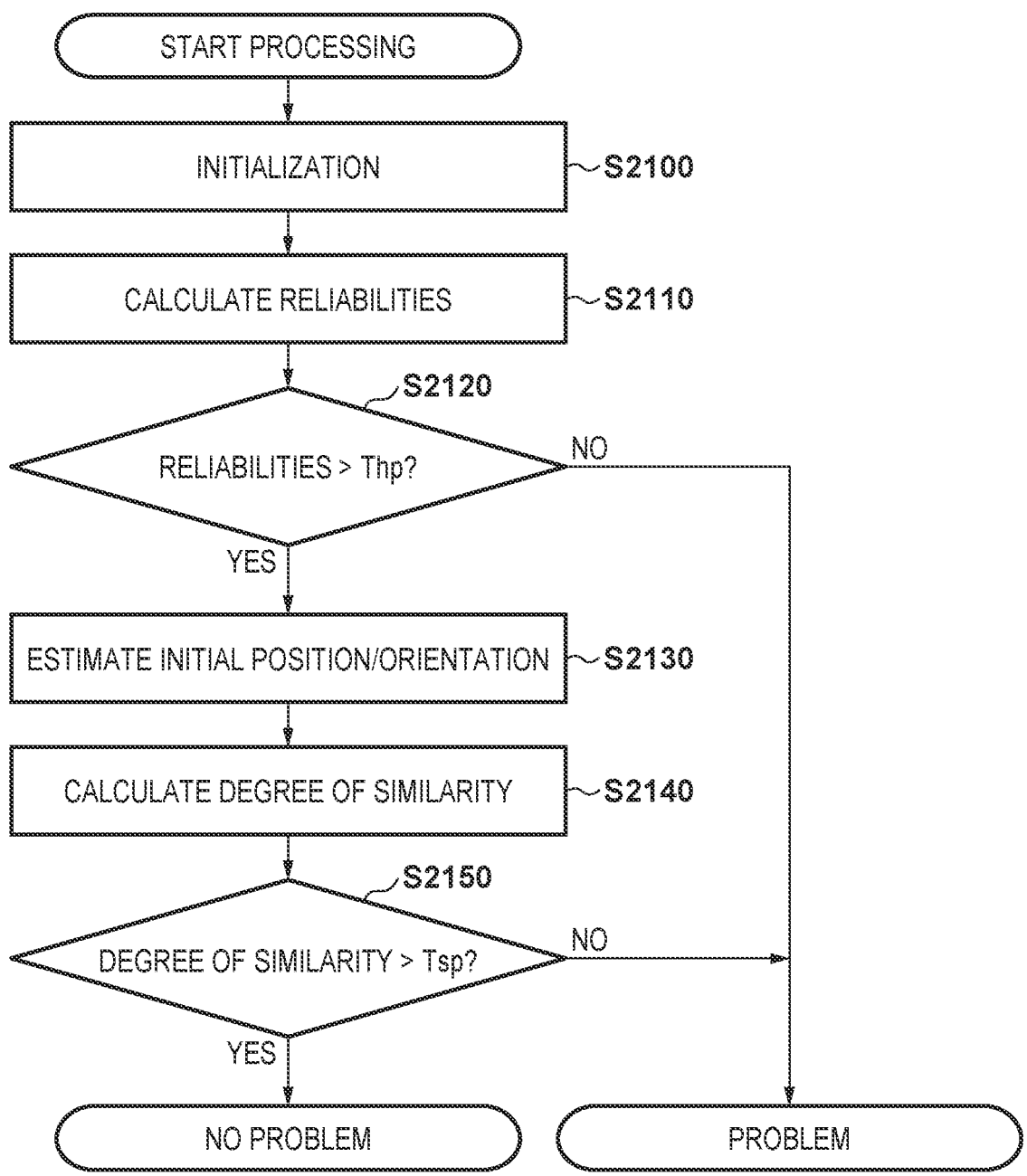
FIG. 9 is a flowchart illustrating a sequence through which a measurement result processing unit determines whether or not there is a problem in a position/orientation, according to the second embodiment.

Processing by Measurement Result Processing Unit for Determining Whether or not there is a Problem in the Position/Orientation Here, FIG. 9 is a flowchart illustrating a sequence through which the measurement result processing unit 104 determines whether or not there is a problem in a position/orientation, in step S2050 according to the second embodiment.

In step S2100, the measurement result processing unit 104 carries out initialization. That is, the position/orientation, the image of the previous frame which will be necessary in the subsequent processing, the geometric information of the peripheral environment map, parameters for thresholds for the reliability and degree of similarity, and the like are loaded.

In step S2110, the measurement result processing unit 104 calculates the reliability pertaining to the position/orientation. Here, the reliability is found for the position/orientation, among the first, second, and third position/orientations, which has been input. The method for finding the reliability has already been described in step S1120 of the first embodiment, and will therefore not be described here.

In step S2120, the measurement result processing unit 104 checks whether or not the reliability found in step S2110 is higher than a threshold Thp. The sequence moves to step S2130 if the reliability is higher than Thp. However, if the reliability is less than or equal to Thp, it is determined that there is a problem, and the sequence ends.

In step S2130, on the basis of the position/orientation in the image one frame previous and the image two frames previous, the measurement result processing unit 104 finds the position/orientation in the current frame through linear interpolation, and takes that position/orientation as an initial position/orientation. However, the initial position/orientation is not limited thereto, and the initial position/orientation may be found from an accelerometer, a GPS sensor, or the like.

In step S2140, the measurement result processing unit 104 calculates the degree of similarity between the initial position/orientation found in step S2130 and the position/orientation calculated in step S2040. Here, the degree of similarity between the two position/orientations is higher the more similar the position/orientations are, and lower the further apart the position/orientations are. For example, a degree of similarity S is found through the following Equation (2).

$$S = k1 * |ti - t| + k2 * \|qi - q\| \quad (2)$$

Here, k1 and k2 represent adjustment parameters; ti and t represent three-dimensional vectors expressing the positions of the initial position/orientation and the position/orientation, respectively; qi and q are quaternions expressing the orientations of the initial position/orientation and the position/orientation, respectively; |x| represents the norm of a real three-dimensional vector x; and $\|y\|$ represents the norm of a quaternion y. Although the method for calculating the degree of similarity has been described with reference to Equation (2), the method is not limited thereto. The degree of similarity may be found through any expression as long as the degree of similarity takes on a higher value the more similar the position/orientations are and a lower value the more different the position/orientations are.

In step S2150, the measurement result processing unit 104 checks whether or not the degree of similarity found in step S2140 is higher than a threshold Tsp. If the degree of similarity is higher than Tsp, it is determined that there is no problem, and the sequence ends. However, if the degree of similarity is less than or equal to Tsp, it is determined that there is a problem, and the sequence ends.

The measurement result processing unit 104 determines whether or not there is a problem in the position/orientation through the processing described thus far.

Effects

As described thus far, according to the second embodiment, the geometric information and position/orientation are estimated having selected one of a plurality of pieces of geometric information; then, by determining whether or not there is a problem in the obtained position/orientation, it is determined whether to use that position/orientation, or re-estimate a different piece of geometric information. Because only a single piece of geometric information and a single position/orientation need be calculated in the calculation processing, there is a lower calculation cost for the processing to be carried out simultaneously than when calculating a plurality of pieces of geometric information, a plurality of position/orientations, and so on as described in the first embodiment; accordingly, the processing can be carried out with relatively small-scale computational resources. Additionally, determining whether or not there is a problem in the calculated position/orientation makes it less likely that an erroneous position/orientation will be used, which increases the safety of autonomous driving, driving assistance, and so on.

Variations

Although the second embodiment described an example in which processing is carried out according to the flowchart illustrated in FIG. 8, the processing is not limited thereto. An example of a functional configuration and a processing sequence according to a variation on the present embodiment will be described here. The example of the functional configuration according to the variation is the same as in the second embodiment, and thus only the geometric information estimating unit 102, the position/orientation calculating unit 103, and the measurement result processing unit 104, which are different, will be described.

As in the second embodiment, the geometric information estimating unit 102 estimates one of the first, second, and third geometric information, and outputs the estimated information to the measurement result processing unit 104. Alternatively, one of the first, second, and third geometric information may first be supplied to the position/orientation calculating unit 103, after which the position/orientation corresponding to that geometric information is calculated, and the corresponding geometric information is updated.

The measurement result processing unit 104 determines whether or not there is a problem in the geometric information input from the geometric information estimating unit 102. If there is no problem in the geometric information, the geometric information is output to the position/orientation calculating unit 103. However, if there is a problem in the geometric information, parameters in a parameter holding unit (not shown) are updated, the geometric information estimating unit 102 is caused to estimate different geometric information, and the determination as to whether or not there is a problem in that geometric information is repeated. Additionally, the geometric information is updated on the basis of the position/orientation input by the position/orientation calculating unit 103, which will be described later. Furthermore, the updated geometric information is output to the display information generating unit 105 and the driving processing device 12. Moreover, the position/orientation is output to the display information generating unit 105 and the driving processing device 12.

The position/orientation calculating unit 103 calculates the position/orientation of the image capturing unit 10 on the basis of the image input by the image input unit 100 and the geometric information input by the measurement result processing unit 104. Additionally, the position/orientation calculating unit 103 supplies the calculated position/orientation to the measurement result processing unit 104.

Figure 10:
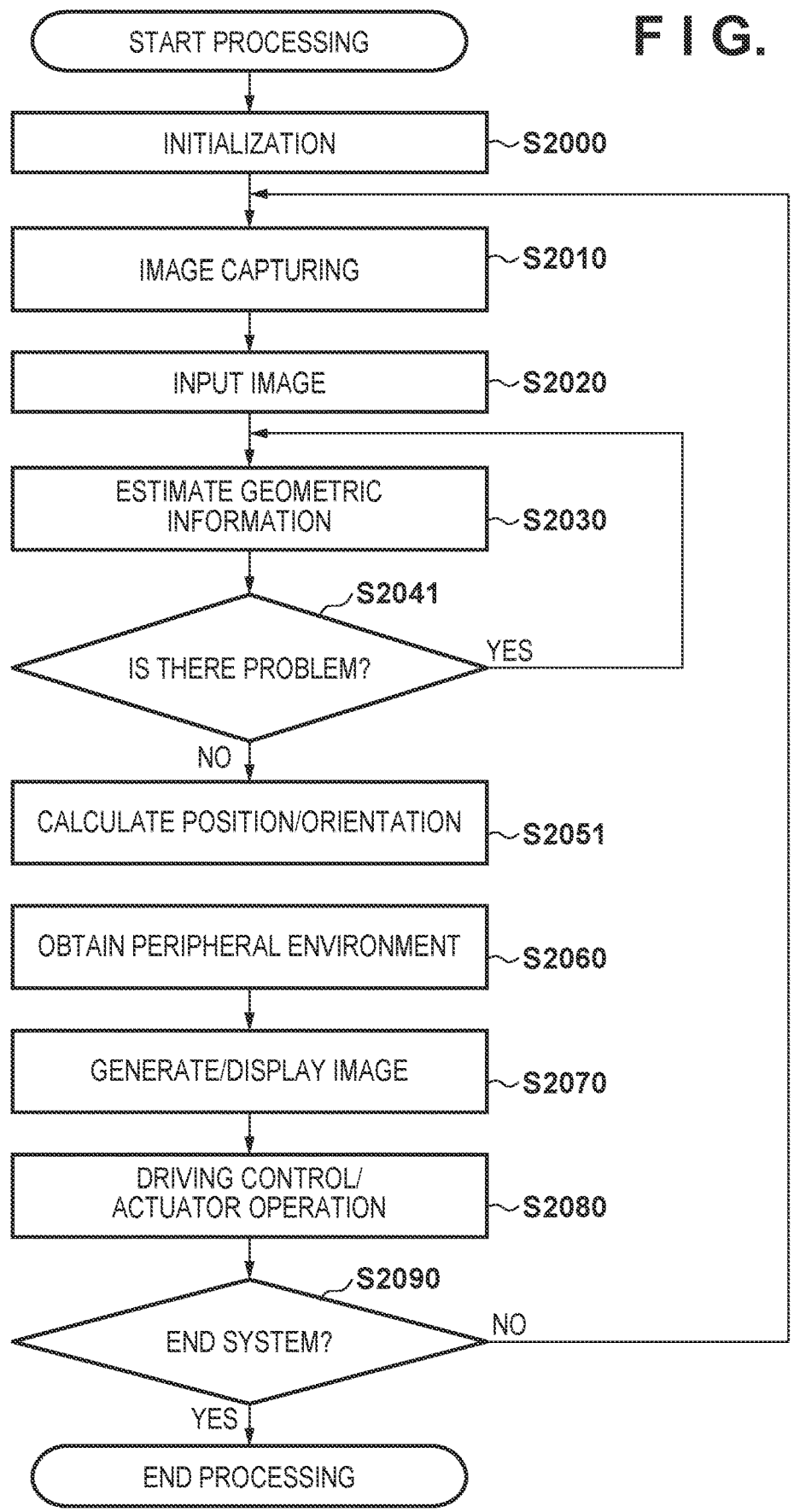
FIG. 10 is a flowchart illustrating a processing sequence according to a variation on the second embodiment.

A processing sequence according to the variation on the present embodiment will be described next. Here, FIG. 10 is a flowchart illustrating a processing sequence according to the variation, carried out by an information processing system including the information processing device 1 according to the present second embodiment. Many of the steps in this flowchart are the same as in the flowchart of FIG. 8, and thus only the different steps, namely step S2041 and step S2051, will be described.

In step S2041, the measurement result processing unit 104 determines whether or not there is a problem in the geometric information calculated in step S2030. The determination method will be described in detail later. If there is no problem in the geometric information, the sequence moves to step S2051. However, if there is a problem in the geometric information, the sequence returns to step S2030, where the geometric information estimating unit 102 is caused to estimate different geometric information.

In step S2051, the position/orientation calculating unit 103 calculates the position/orientation of the image capturing unit 10 on the basis of the geometric information calculated in step S2041. Specifically, the position/orientation with respect to the peripheral environment map is calculated by aligning the geometric information calculated by the measurement result processing unit 104 with respect to the geometric information in the peripheral environment maps found in the frames thus far. Additionally, on the basis of the position/orientation in the image one frame previous and the image two frames previous, the position/orientation in the current frame is found through linear interpolation, and used as an initial position/orientation when carrying out alignment. The geometric information of the peripheral environment map is also updated by carrying out alignment.

Figure 11:
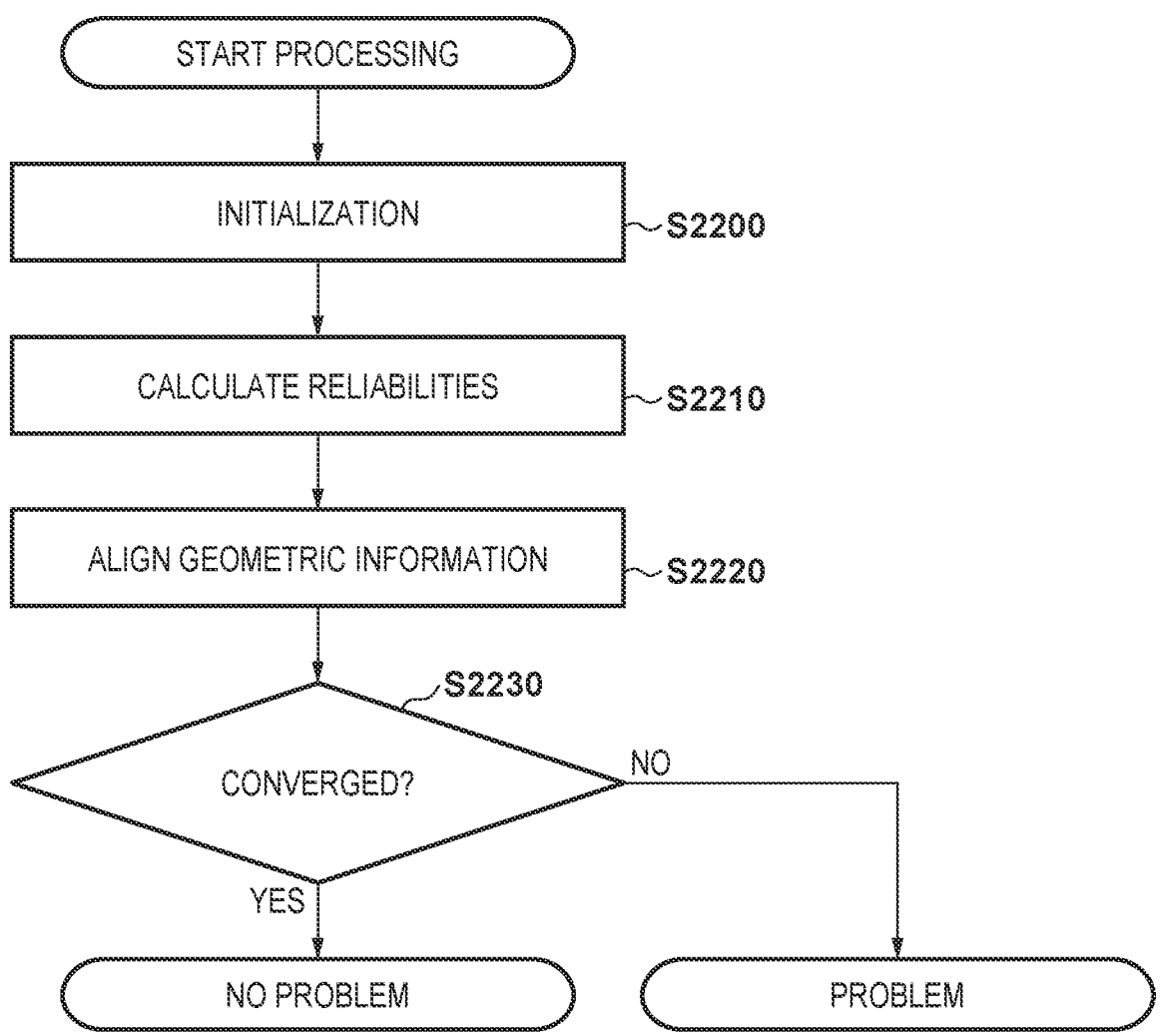
FIG. 11 is a flowchart illustrating a sequence through which a measurement result processing unit determines whether or not there is a problem in geometric information, according to the second embodiment.

Processing by Measurement Result Processing Unit for Determining Whether or not there is a Problem in the Geometric Information Here, FIG. 11 is a flowchart illustrating a sequence through which the measurement result processing unit 104 determines whether or not there is a problem in geometric information in S2041, according to the variation on the present second embodiment.

In step S2200, the measurement result processing unit 104 carries out initialization. That is, the geometric information, the image of the previous frame which will be necessary in the subsequent processing, the geometric information of the peripheral environment map, parameters used when solving optimization problems, and the like are loaded.

In step S2210, the measurement result processing unit 104 calculates the reliability pertaining to the geometric information found in step S2030. The measurement result processing unit 104 finds the reliability for the input geometric information in accordance with which of the first, second, and third geometric information has been input. The method for finding the reliability has already been described in processing step S1210 of the variation on the first embodiment, and will therefore not be described here.

In step S2220, the measurement result processing unit 104 aligns the geometric information having the reliability found in step S2210 with the geometric information in the peripheral environment maps found thus far, through weighted ICP.

In step S2230, the measurement result processing unit 104 determines whether or not error in the alignment has converged in the weighted ICP. If the error has converged, there is no problem in the geometric information, and the sequence ends. If the error has not converged, there is a problem in the geometric information, and the sequence ends. The measurement result processing unit 104 determines whether or not there is a problem in the geometric information through the processing described thus far.

Although the measurement result processing unit 104 determines whether or not there is a problem in the position/orientation in the second embodiment as described above, the measurement result processing unit 104 may determine whether or not there is a problem in the geometric information, as described in the variation.

Although the second embodiment describes the parameters specifying one of the first, second, and third geometric information as being held in the parameter holding unit in the geometric information estimating unit 102 and in step S2030, the configuration is not limited thereto. The reliabilities of the first, second, and third geometric information may be held as parameters, and the geometric information having the highest reliability may be selected and used for the estimation. Additionally, rather than holding the reliability in the parameter holding unit, a reliability calculated from information obtained up to the previous frame may be used.

The second embodiment and the variation thereon described a method in which the measurement result processing unit 104 determines whether or not there is a problem in the position/orientation or the geometric information, with reference to the flowcharts in FIG. 9 and FIG. 11. However, the method for determining whether or not there is a problem is not limited thereto. For example, if the first image capturing device and the second image capturing device are configured to output signals indicating an error state when an abnormality has arisen therein, the measurement result processing unit may determine that there is a problem at the point in time when the signal indicating an error state has been received from one of the image capturing devices, and then change the parameters in the parameter holding unit (not shown) so that the geometric information and the position/orientation are estimated on the basis of the image capturing device which is not in an error state.

In the flowcharts in FIG. 8 and FIG. 10, which indicate the flow of processing in the second embodiment, the processing returns to the geometric information estimation, and does not progress as far as driving control, until it is determined that there is no problem in the position/orientation or the geometric information. However, driving control may be carried out continuously, with the driving control parameters being updated when an update is made using the newest information. In other words, the driving control may be assigned to another thread, and when it has been determined that there are no problems in the position/orientation or the geometric information, the position/orientation or the peripheral environment map may be updated using that information to reflect the information in the driving control as well. This makes it possible for the autonomous driving or driving assistance function to continue operating without stopping even if a problem has arisen in the geometric information or the position/orientation.

In the flowcharts in FIG. 8 and FIG. 10, which illustrate the flow of processing according to the second embodiment, the sequence returns to the estimation of the geometric information until it is determined that there is no problem in the position/orientation or the geometric information, and thus it is possible that the sequence will become stuck in an endless loop if a problem has occurred in all of the first, second, and third geometric information and the position/orientation. As such, the sequence may be restarted from the image capturing if a determination that there is a problem has been made three times in a row. Alternatively, the display information generating unit 105 may generate and display an image for notifying the user that there is a problem in the measurement. Or, the display information generating unit 105 may display a prompt to change to a driving mode in which the driving is handled by a person.

Although the second embodiment describes a case where the two image capturing devices capture and input the first image and the second image in step S2010 and step S2020, the configuration is not limited thereto. For example, in normal situations, the first image may be input using only the first image capturing device, and the second geometric information may be estimated in the subsequent processing. Furthermore, if it has been determined that there is a problem in the second geometric information, the sequence may return to the image capturing of step S2010, and an image may then be captured using only the second image capturing device, or both the first image capturing device and the second image capturing device. In this case, only one image capturing device is normally used, which makes it possible to suppress power consumption and computation costs.

In the second embodiment, the display information generating unit 105 may generate display information for notifying the user as to whether or not there is a problem, and display that information in the display unit 11, in step S2070. For example, when there is no problem, an indication of which geometric information or position/orientation is being used for the driving control may be displayed. Which image capturing device was used to capture the image may be displayed as well. However, when there is a problem, which of the first, second, and third geometric information or the position/orientation has the problem may be displayed. A display which notifies the user of an abnormality in the first image capturing device or the second image capturing device may be displayed as well. Alternatively, if the problem will likely continue for a set amount of time, a display prompting the user to inspect or repair the part thought to be the cause of the problem may be made. Through this, the user can visually confirm the state in the periphery of the information processing system.

Although the second embodiment describes estimating one piece of geometric information, the configuration is not limited thereto. For example, as in the first embodiment, the first, second, and third geometric information or the first, second, and third position/orientations may be estimated, and whether or not there are problems in each thereof may be confirmed. If there are a plurality of pieces of geometric information or position/orientations which do not have problems, one of those may be selected at random, and the sequence may then proceed to the next step; or geometric information or a position/orientation may be found from the plurality of pieces of geometric information or position/orientations which do not have problems, as in step S1050 or step S1041 described in the first embodiment. Alternatively, geometric information or a position/orientation which has a problem may be set to have a lower reliability or ICP weighting than geometric information or a position/orientation which does not have a problem in Equation 1. Doing so explicitly removes data having a problem, which makes it possible to carry out more robust estimation than the estimation results according to the first embodiment.

Third Embodiment

In the above-described second embodiment, the measurement result processing unit determines whether or not there is a problem in the geometric information or the position/orientation, and calculates the geometric information or the position/orientation using an estimation result which does not have a problem. As opposed to this, in a third embodiment, the measurement result processing unit not only makes a determination for the geometric information or the position/orientation, but if there is a problem, the measurement result processing unit also solves the problem by eliminating the cause of the problem or avoiding the problem. As such, even when there is a problem, the geometric information or the position/orientation is estimated, and the autonomous driving or driving assistance is carried out, in a robust manner. The configuration of the automobile according to the present third embodiment is the same as that described in the first embodiment with reference to FIG. 1, and will therefore not be described here.

Configuration of Information Processing Device

Figure 12:
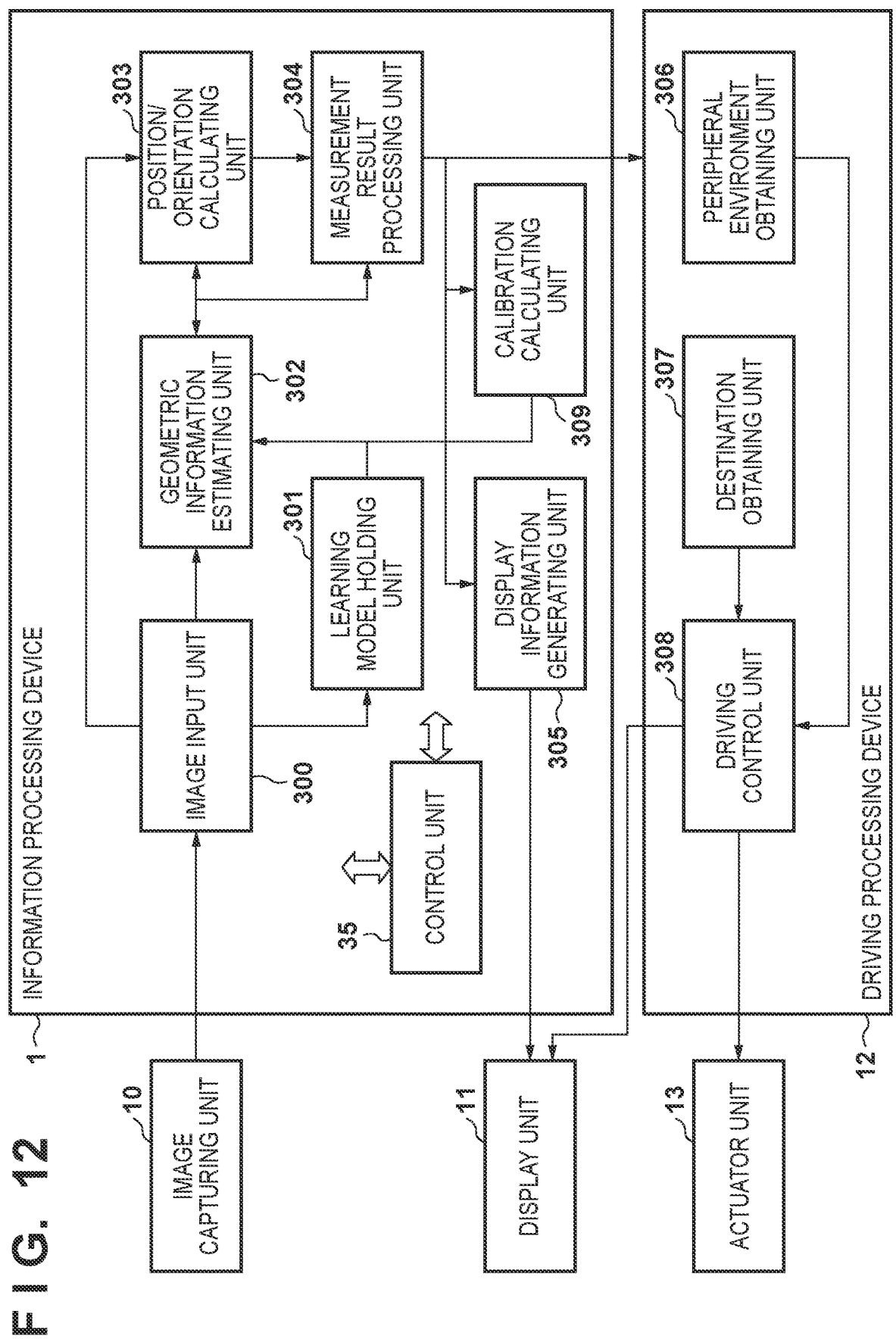
FIG. 12 is a diagram illustrating the functional configuration of an information processing device and a driving processing unit according to a third embodiment.

FIG. 12 is a diagram illustrating an example of the functional configuration of the information processing device 1 and the driving processing device 12 according to the present third embodiment. The information processing device 1 includes an image input unit 300, a learning model holding unit 301, a geometric information estimating unit 302, a position/orientation calculating unit 303, a measurement result processing unit 304, a display information generating unit 305, a calibration calculating unit 309, and a control unit 35 which controls the device as a whole. The driving processing device 12 includes a peripheral environment obtaining unit 306, a destination obtaining unit 307, and a driving control unit 308 that controls the device as a whole. The image input unit 300, the learning model holding unit 301, the geometric information estimating unit 302, the position/orientation calculating unit 303, the display information generating unit 305, the peripheral environment obtaining unit 306, the destination obtaining unit 307, the driving control unit 308, and the control unit 35 correspond to the image input unit 100, the learning model holding unit 101, the geometric information estimating unit 102, the position/orientation calculating unit 103, the display information generating unit 105, the peripheral environment obtaining unit 106, the destination obtaining unit 107, the driving control unit 108, and the control unit 15 according to the first embodiment, respectively. Descriptions will not be given of functions that are the same, and only the measurement result processing unit 304 and the calibration calculating unit 309 which are different will be described.

The measurement result processing unit 304 detects a problem, an abnormality, or the like on the basis of the first, second, and third position/orientations calculated by the position/orientation calculating unit 303 and the first, second, and third geometric information, and carries out operations for eliminating that problem, abnormality, or the like. The measurement result processing unit 304 then calculates a position/orientation and geometric information, and outputs those to the display information generating unit 305 and the driving processing device 12. Details will be given later.

Upon receiving an instruction for calibration from the measurement result processing unit 304, the calibration calculating unit 309 calibrates the first image capturing device and the second image capturing device, and finds calibration parameters. Calibration parameters in a calibration parameter holding unit (not shown) are updated using the calibration parameters which have been found.

Processing

Figure 13:
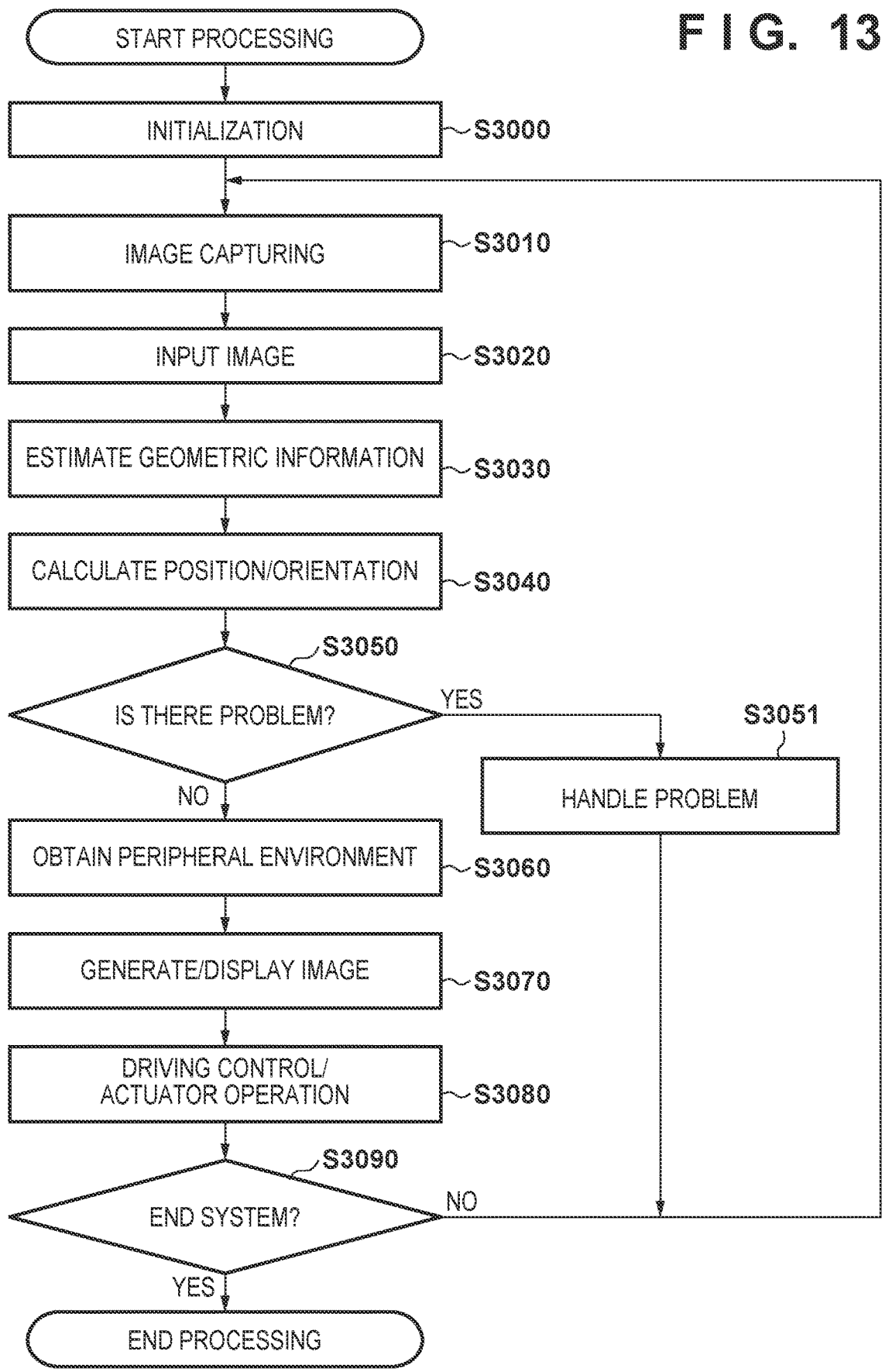
FIG. 13 is a flowchart illustrating a processing sequence carried out by an information processing system according to the third embodiment.

A processing sequence according to the present third embodiment will be described next. FIG. 13 is a flowchart illustrating a processing sequence carried out by an information processing system including an information processing device 3 according to the present embodiment.

The flowchart according to the present third embodiment is basically the same as the flowchart described in the first embodiment with reference to FIG. 4. Step S3000, step S3010, step S3020, step S3030, step S3040, step S3060, step S3070, step S3080, and step S3090 have the same processing as step S1000, step S1010, step S1020, step S1030, step S1040, step S1060, step S1070, step S1080, and step S1090, respectively, and will therefore not be described; only step S3050 and step S3051, which are different, will be described.

In step S3050, the measurement result processing unit 304 determines whether or not there is a problem in each of the first, second, and third position/orientations and the first, second, and third geometric information calculated in step S3040. If there is not even a single problem, the sequence moves to step S3060. If there is a problem, however, the sequence moves to step S3051. The specific processing for determining whether or not there is a problem has already been described in the second embodiment with reference to the flowcharts in FIG. 9 and FIG. 11, and will therefore not be described here.

In step S3051, the measurement result processing unit 304 carries out processing for eliminating the problem (described in detail later) on the basis of the first, second, and third position/orientations or the first, second, and third geometric information which has the problem. The measurement result processing unit 304 then returns the sequence to step S3010.

With respect to the driving control while the problem is being eliminated, a driving mode in which a person is driving is switched to so that autonomous driving or driving assistance is not carried out. However, the configuration is not limited thereto, and if it will only take a relatively short time to eliminate the problem and there have been no problems in the estimation results thus far, the driving control may be carried out on the basis of the estimation results thus far and predictions made in time series. For example, when traveling straight down a single road without obstacles or the like in the periphery, autonomous driving or driving assistance may be carried out if it can be estimated that such a state will continue.

Processing by Measurement Result Processing Unit for Eliminating Problem

Figure 14:
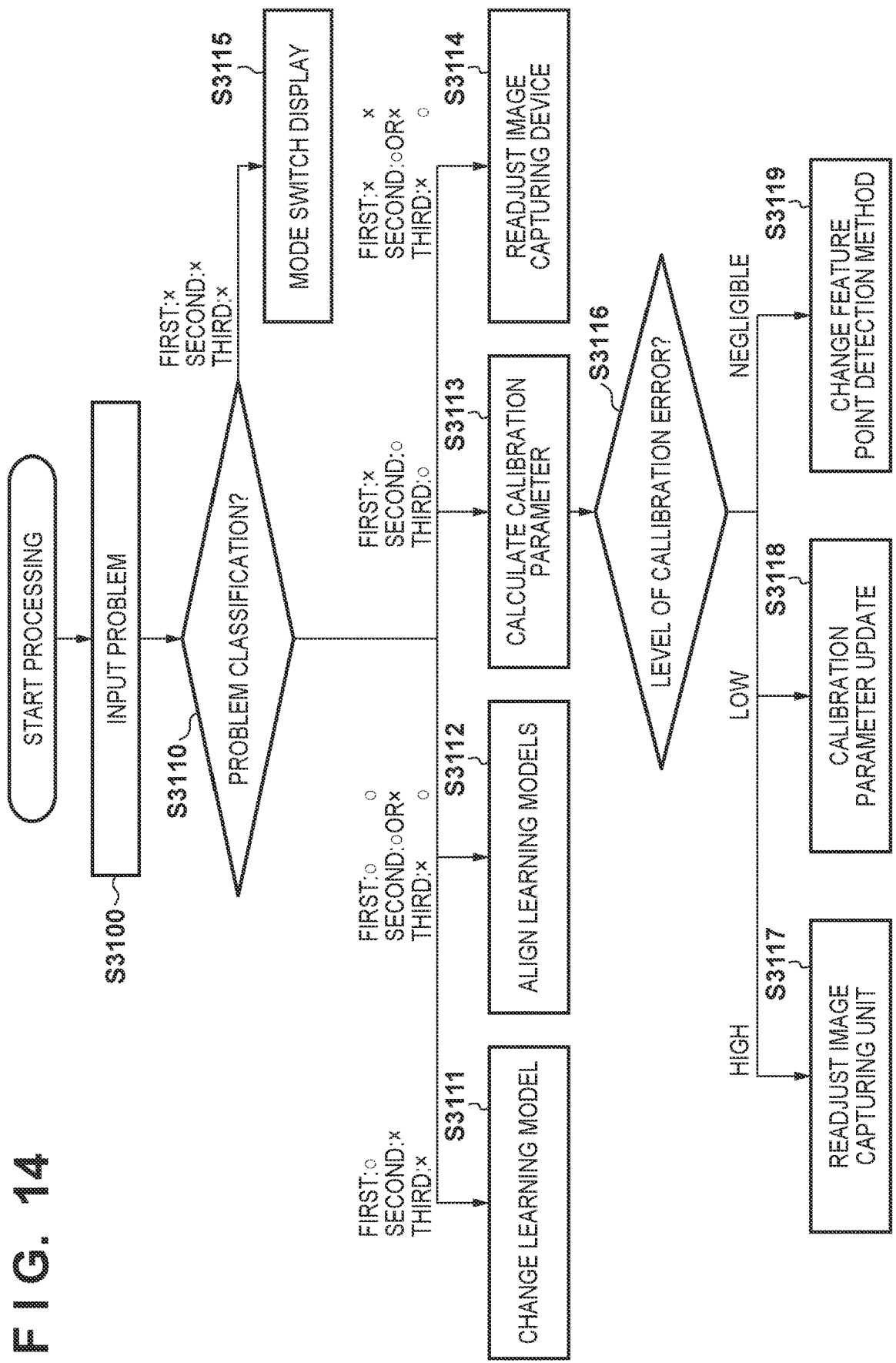
FIG. 14 is a flowchart illustrating a sequence through which a measurement result processing unit eliminates a problem, according to the third embodiment.

Here, FIG. 14 is a flowchart illustrating a sequence through which the measurement result processing unit 304 eliminates a problem in step S3051 according to the present third embodiment.

In step S3100, the measurement result processing unit 304 obtains information indicating which of the first, second, and third position/orientations and the first, second, and third geometric information has a problem.

In step S3110, the measurement result processing unit 304 classifies the input information. For notation used in the classification method, the following will use "first: x" for a case where there is a problem in the first position/orientation or geometric information, and "first: o" for a case where there is no problem. For example, "first: o, second: x, third: x" indicates that there are no problems in the first position/orientation and geometric information, there is a problem in the second position/orientation or geometric information, and there is a problem in the third position/orientation or geometric information. If the problem classification results in "first: o, second: x, third: x", the measurement result processing unit 304 moves the sequence to step S3111. If "first: o, second: o, third: x" or "first: o, second: x, third: o", the measurement result processing unit 304 moves the sequence to step S3112. If "first: x, second: o, third: o", the measurement result processing unit 304 moves the sequence to step S3113. If "first: x, second: o, third: x" or "first: x, second: x, third: o", the measurement result processing unit 304 moves the sequence to step S3114. Finally, if "first: x, second: x, third: x", the measurement result processing unit 304 moves the sequence to step S3115.

In step S3111, the measurement result processing unit 304 improves the estimation of the second and third geometric information by the geometric information estimating unit 302 by changing the learning model held by the learning model holding unit 301. Preferably, the learning model which is changed is a model which has been trained using scenes similar to the captured scene. As a method for making the change, a feature amount may be extracted from an image of the captured scene and the learning model may be determined on the basis of the extracted feature amount, or, on the basis of the current position of the automobile, the learning model may be selected using experiences in which other automobiles have made similar position changes in the past.

In step S3112, the measurement result processing unit 304 improves the estimation of one of the second and third geometric information by the geometric information estimating unit 302 by aligning the learning models, held by the learning model holding unit 301, which are used when estimating the second and third geometric information. The learning model used to estimate the geometric information which does not have a problem is employed as the learning model that is the basis of the alignment. However, the configuration is not limited thereto, and rather than aligning one learning model with the other learning model, both learning models may be changed, in the same manner as in step S3111.

In step S3113, the measurement result processing unit 304 calculates the calibration parameters between the first image capturing device and the second image capturing device at the point in time when the calibration calculating unit 309 has captured an image. The calibration parameters are calculated on the basis of the second position/orientation and the third position/orientation, by finding a transform from the one to the other. However, the calculation method is not limited thereto, and the calculation may be carried out on the basis of the first image and the second image, or on the basis of the second geometric information and the third geometric information. The measurement result processing unit 304 then moves the sequence to step S3116.

In step S3116, the measurement result processing unit 304 compares the calibration parameters calculated in step S3113 with the calibration parameters held in the calibration parameter holding unit (not shown), and finds an error between the two. If there is a high calibration error, and the overlapping region of the captured scenes in the first image and the second image occupies less than half the region of the image, the measurement result processing unit 304 moves the sequence to step S3117. However, if there is calibration error but the error is low, the measurement result processing unit 304 moves the sequence to step S3118. If there is substantially no calibration error, and the calculated calibration parameters can be considered to be substantially identical to the calibration parameters held in the calibration parameter holding unit, the measurement result processing unit 304 moves the sequence to step S3119.

In step S3117, the display information generating unit 305 generates an image for instructing the user to rearrange at least one of the first image capturing device and the second image capturing device to an appropriate position/orientation, and displays that image using the display unit 11. Specifically, the position/orientation is found for each of the first image capturing device and the second image capturing device in the vehicle, and the user moves the image capturing devices so as to enter a range for a pre-set, ideal position/orientation for the image capturing devices. At this time, the display information generating unit 305 generates an image indicating to what degree the ideal position/orientation for the image capturing devices coincides with the current position/orientation of the image capturing devices, or an image indicating how the devices should be moved to approach the ideal position/orientation, and the generated images displayed using the display unit 11. Once the user finishes arranging the image capturing devices, the calibration calculating unit 309 calculates current calibration parameters, and uses those parameters to update the calibration parameters held by the calibration parameter holding unit (not shown). In this manner, the estimation of the first geometric information by the geometric information estimating unit 302 is improved by the user readjusting the image capturing devices to an appropriate position/orientation. Additionally, to find the position/orientations of the image capturing devices in the vehicle in a stable manner, a learning model trained using training data measured within the vehicle may be prepared in advance, and the learning model held by the learning model holding unit 301 may be changed to this model.

In step S3118, the measurement result processing unit 304 uses the calibration parameters calculated in step S3113 to update the calibration parameters held in the calibration parameter holding unit (not shown). The estimation of the first geometric information by the geometric information estimating unit 302 is improved as a result.

In step S3119, a method for detecting feature points used when the geometric information estimating unit 302 finds the correspondence relationship between the first image and the second image in order to estimate the first geometric information is changed. The estimation of the first geometric information by the geometric information estimating unit 302 is improved as a result. In terms of the method for detecting the feature points, a variety of feature amounts, such as SIFT, ORB, and AKAZE, are known, and the method is not particularly limited here. Additionally, although the method for detecting the feature points is described as being changed here, the configuration is not limited thereto. For example, the geometric information estimation carried out stereoscopically may be improved by changing an index indicating the degree of similarity for finding the stereo correspondence relationship among SAD, SSD, NCC, ZNCC, or the like, or a search range, threshold, or the like may be changed.

In step S3114, the measurement result processing unit 304 improves the image capturing devices themselves by restarting the image capturing devices in the image capturing unit 10 which have the problem. Additionally, the display information generating unit 305 generates images for displaying the first image and the second image side-by-side, and displays those images in the display unit 11, so that the user can confirm whether or not there are problems in the first image and the second image captured by the first image capturing device and the second image capturing device, respectively. Although an example in which the image capturing devices are improved by restarting the image capturing devices is described here, the configuration is not limited thereto. For example, the display information generating unit 305 may display a prompt to replace an image capturing device if the image capturing device has broken down and cannot capture images. Additionally, if an abnormality has arisen in the lens of the image capturing device, the display information generating unit 305 may display a prompt to replace or clean the lens.

In step S3115, the display information generating unit 305 generates an image indicating that the autonomous driving or driving assistance function cannot be activated and that the mode will be switch to a driving mode in which a person is driving, and displays that image in the display unit 11. Furthermore, while the person is driving, an attempt is made to restore the system by executing improvement measures such as step S3111, step S3112, step S3114, step S3117, step S3118, and step S3119. The measurement result processing unit 304 eliminates the problem through the processing described thus far.

Effects

According to the third embodiment as described thus far, if there is a problem in the estimated geometric information or position/orientation, processing is carried out in order to eliminate the problem, which makes it possible to continuously operate the system in a more safe and stable manner. Additionally, displaying the state of the problem so as to notify the user makes it possible for the user to use the autonomous driving or driving assistance functions more securely.

Variations

Although the third embodiment described an example in which processing is carried out according to the flowchart illustrated in FIG. 13, the processing is not limited thereto. The third embodiment describes an example in which the position/orientation is calculated in step S3040, whether or not there is a problem is determined in step S3050, and the problem is then handled; however, whether or not there is a problem may be determined using the geometric information calculated in step S3030, the problem may then be handled, and the position/orientation may be calculated thereafter, as in the variation on the first embodiment and the variation on the second embodiment.

The third embodiment described an example in which the sequence moves to either step S3060 or step S3051 depending on whether or not there is a problem in step S3050. However, the configuration is not limited thereto. For example, even if there is a problem, but there is no problem in one of the first, second, and third geometric information and the position/orientation, the sequence may branch in two, with the problem being handled in step S3051, and the processing of step S3060 being carried out using the geometric information and the position/orientation which have no problem. Accordingly, the autonomous driving or driving assistance function can continue to be used even if there is a problem.

The third embodiment described an example in which the problem is handled immediately when it is determined that there is a problem in step S3051. However, the configuration is not limited thereto. For example, if an obstacle has moved in front of the first image capturing device, it is determined that there is a problem in the first and second geometric information, but the problem will resolve on its own once the obstacle is gone. As such, the configuration may be such that the problem is handled only when the problem persists for several frames. This makes it possible to prevent an unnecessary increase in the computational load.

Fourth Embodiment

The first, second, and third embodiments described examples in which the geometric information estimating unit estimates the geometric information using an existing learning model. As opposed to this, in a fourth embodiment, training data for training the learning model is obtained, and the learning model is generated by carrying out learning. Accordingly, autonomous driving or driving assistance is carried out by generating a new learning model which enables the geometric information to be estimated even for scenes which are unknown and for which the geometric information therefore cannot be estimated using an existing learning model. The configuration of the automobile according to the present fourth embodiment is the same as that described in the first embodiment with reference to FIG. 1, and will therefore not be described here.

Configuration of Information Processing Device

Figure 15:
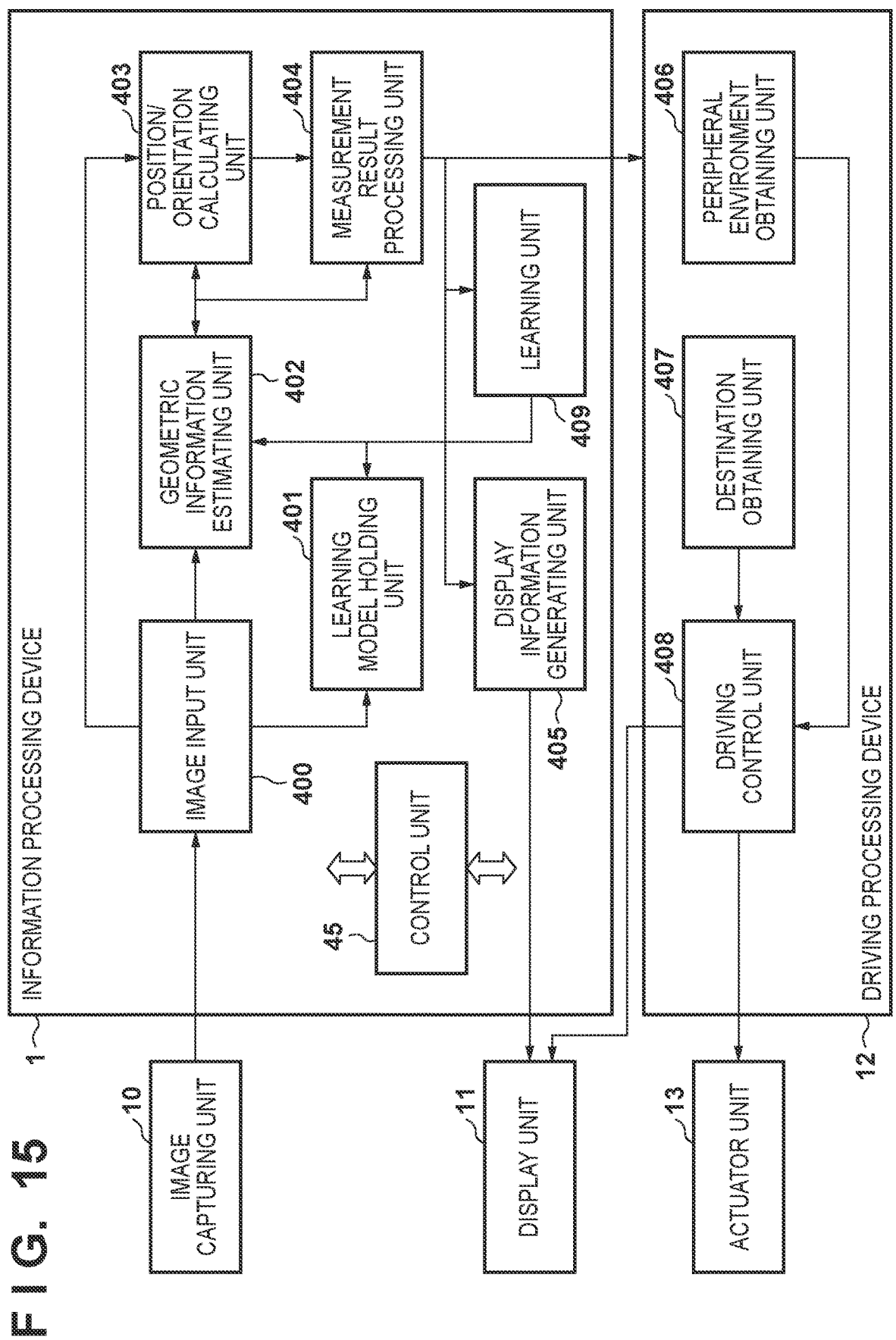
FIG. 15 is a diagram illustrating the functional configuration of an information processing device and a driving processing unit according to a fourth embodiment.

FIG. 15 is a diagram illustrating an example of the functional configuration of the information processing device 1 and the driving processing device 12 according to the present embodiment. The information processing device 1 includes an image input unit 400, a learning model holding unit 401, a geometric information estimating unit 402, a position/orientation calculating unit 403, a measurement result processing unit 404, a display information generating unit 405, a learning unit 409, and a control unit 45. The driving processing device 12 includes a peripheral environment obtaining unit 406, a destination obtaining unit 407, and a driving control unit 408. The image input unit 400, the learning model holding unit 401, the geometric information estimating unit 402, the position/orientation calculating unit 403, the measurement result processing unit 404, the display information generating unit 405, the peripheral environment obtaining unit 406, the destination obtaining unit 407, the driving control unit 408, an actuator unit 43, and the control unit 45 correspond to the image input unit 300, the learning model holding unit 301, the geometric information estimating unit 302, the position/orientation calculating unit 303, the measurement result processing unit 304, the display information generating unit 305, the peripheral environment obtaining unit 306, the destination obtaining unit 307, the driving control unit 308, the actuator unit 33, and the control unit 35, respectively, according to the third embodiment. Descriptions will not be given of functions that are the same, and only the learning model holding unit 401, the measurement result processing unit 404, and the learning unit 409, which are different, will be described.

The learning model holding unit 401 holds a model for estimating the geometric information from an image. The learning model holding unit 401 also holds a learning model supplied from the learning unit 409, which will be described later. The geometric information estimating unit 402 can therefore select an appropriate learning model based on the circumstances.

In addition to the functions of the measurement result processing unit 304 according to the third embodiment, the measurement result processing unit 404 generates training data used when training the learning model, on the basis of the first image, the second image, and the geometric information corresponding to those images. The measurement result processing unit 404 then outputs the generated training data to the learning unit 409.

The learning unit 409 carries out learning on the basis of the training data input from the measurement result processing unit 404, and generates a learning model. The generated learning model is output to the learning model holding unit 401.

Processing

Figure 16:
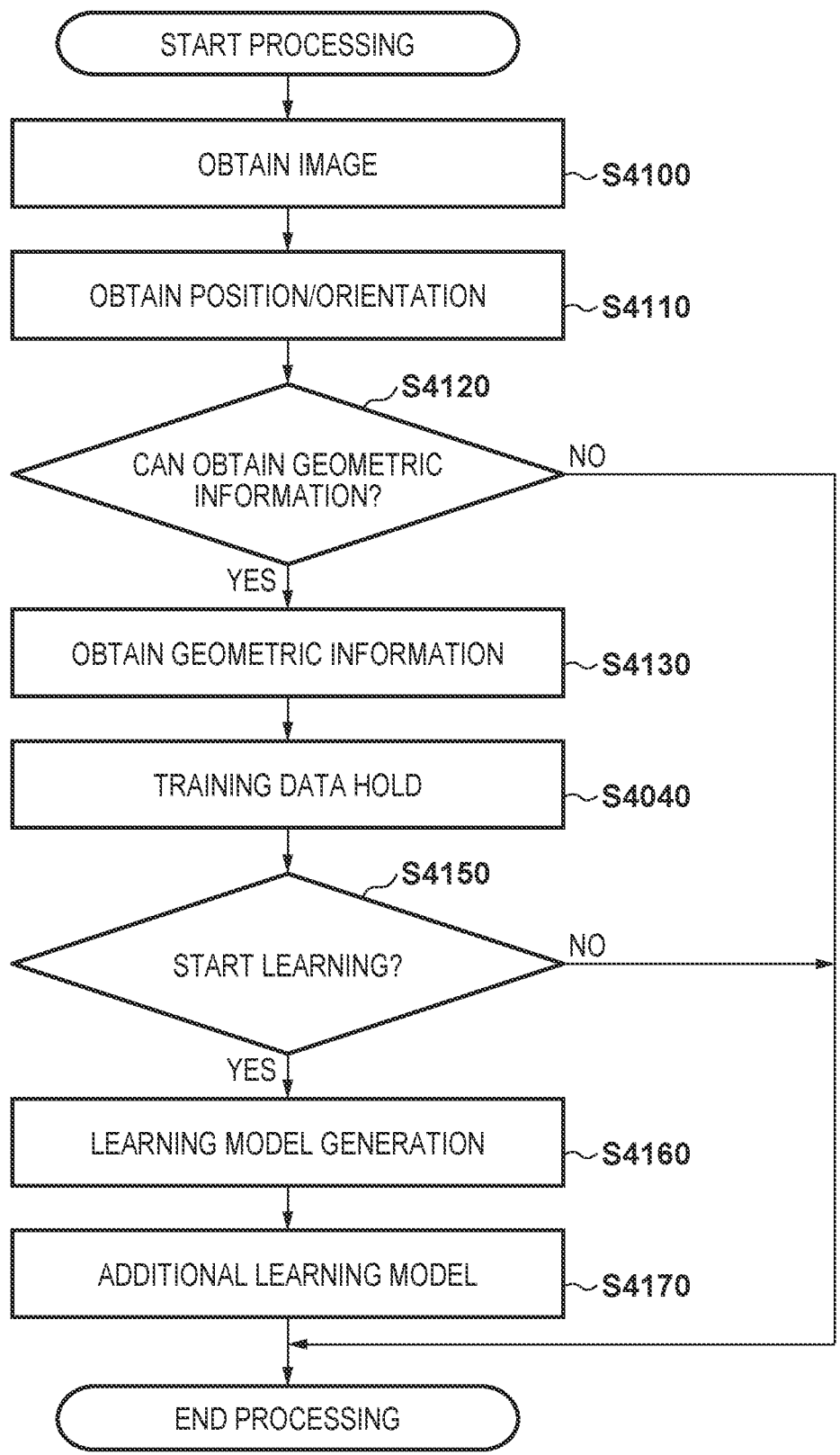
FIG. 16 is a flowchart illustrating a processing sequence through which training data is obtained and learning is carried out, according to the fourth embodiment.

A processing sequence according to the present fourth embodiment will be described next. The processing sequence according to the present fourth embodiment adds some processing to the flowchart described in the third embodiment with reference to FIG. 13; the rest is the same and therefore will not be described. A processing sequence according to the present fourth embodiment, in which training data is obtained and learning is carried out, is carried out as parallel processing after step S3060 described in the third embodiment with reference to FIG. 13. Here, FIG. 16 is a flowchart illustrating a processing sequence through which training data is obtained and learning is carried out.

In step S4100, the measurement result processing unit 404 obtains the first image and the second image, and holds the images in an obtainment list. However, the configuration is not limited thereto, and it is also possible to obtain and hold only one of the images.

In step S4110, the measurement result processing unit 404 obtains the position/orientation, and holds the position/orientation in the obtainment list in association with the image already held in the obtainment list. However, the "position/orientation" mentioned here is the final position/orientation calculated by the measurement result processing unit 404, and is the position/orientation used in driving control.

In step S4120, the measurement result processing unit 404 determines whether or not geometric information corresponding to the image held in the obtainment list can be obtained. If the information can be obtained, the measurement result processing unit 404 moves the sequence to step S4130. However, if the information cannot be obtained, the measurement result processing unit 404 ends the sequence while still holding the obtainment list. In this case, when the processing for obtaining the training data is resumed in the next frame or after several frames, further information is added to the obtainment list which is held. Here, a case where the "geometric information can be obtained" corresponds to a case where geometric information updated with respect to the image is obtained.

In step S4130, the measurement result processing unit 404 obtains geometric information corresponding to the image on the basis of the image held in the obtainment list and the position/orientation.

In step S4140, the measurement result processing unit 404 takes the image and geometric information associated in step S4130 as a set, and outputs that set to the learning unit 409 as the training data. The learning unit 409 holds the training data input from the measurement result processing unit 404.

In step S4150, the learning unit 409 determines whether or not to start learning, and the sequence moves to step S4160 if learning is to be started. The sequence ends if learning is not to be started. In this case, the training data is held as additional data when the processing for obtaining the training data is restarted. The determination as to whether or not to start the learning is made on the basis of whether or not a sufficient amount of training data is held.

In step S4160, the learning unit 409 carries out learning using the training data group which is held, and generates the learning model. Specifically, the training data is supplied as a pair including an image and geometric information, and the learning unit 409 carries out the learning by estimating weights in a CNN so that when an image is provided as an input, geometric information corresponding to an output image is obtained as an output. However, the learning method is not limited thereto, and a model aside from a CNN may be used instead.

In step S4170, the learning model holding unit 401 adds and holds the learning model generated by the learning unit 409 in step S4160. By adding and holding the model, when the geometric information estimating unit 402 estimates the geometric information, the geometric information can be estimated having selected a learning model from among a plurality of learning models. However, the configuration is not limited thereto, and the learning model holding unit 401 may update the learning model to a new learning model. The training data is obtained, and learning is carried out, through the processing described thus far.

Effects

According to the fourth embodiment as described thus far, the position/orientation can be estimated stably, and the autonomous driving or driving assistance can be carried out more safely, by generating a learning model and estimating the geometric information using the generated learning model for scenes in which the geometric information could not be estimated using an existing learning model. Additionally, by automatically generating the training data while the information processing device is carrying out processing, the burden of separately creating a massive amount of training data needed to train the learning model, adding labels, and so on can be eliminated.

Variations

Although the fourth embodiment described an example in which the measurement result processing unit 404 obtains the training data after step S3060 described in the third embodiment with reference to FIG. 13, the configuration is not limited thereto. For example, the image may be held in the obtainment list before, after, or in parallel with step S3111 described in the third embodiment with reference to FIG. 14. In other words, the image may be held in the obtainment list only when a problem has arisen in the second and third geometric information estimated using the learning model, and the second and third position/orientations corresponding thereto. This makes it possible to obtain a group of images for a scene in which the geometric information cannot be estimated using an existing learning model, and thus the scenes for which the geometric information can be estimated can be expanded efficiently by carrying out learning using the training data generated on the basis of that group of images.

Although the fourth embodiment described an example in which the measurement result processing unit 404 carries out learning after step S3060 described in the third embodiment with reference to FIG. 13, the configuration is not limited thereto. For example, the images, position/orientations, geometric information, and the like necessary for learning may all be saved as data, and the training data may be generated separately offline using an information processing device for learning, after which the learning is carried out. In this case, the functions of the learning unit 409 may be transferred to the other information processing device, separate from the information processing device 1. This eliminates the need to have the computational resources for carrying out learning within the vehicle, which makes it possible to suppress the cost of the information processing device 1.

Although the fourth embodiment described an example in which the learning unit 409 uses only the training data generated by the measurement result processing unit 404, the configuration is not limited thereto. For example, the learning may be carried out using some or all of a group of training data used when training the existing learning model as well. Additional learning may be carried out using the existing learning model as a base as well.

Although the fourth embodiment described the geometric information as being obtainable when geometric information updated with respect to the image is obtained in step S4120, the configuration is not limited thereto. For example, a percentage of the geometric information obtained with respect to the image being greater than or equal to a threshold may be used as the condition under which the geometric information can be obtained. Alternatively, when the vehicle has departed an area within a set range corresponding to the image, the geometric information may be made obtainable after first being updated.

Although the fourth embodiment described an example in which the image obtained in step S4100 and the geometric information obtained in step S4130 have both been measured by the host vehicle, and the training data is generated using that image and information, the configuration is not limited thereto. For example, an image or geometric information of a required area may be downloaded from a server and used to generate the training data.

The fourth embodiment described the geometric information estimating unit 402 as selecting an appropriate learning model from among a plurality of learning models held in the learning model holding unit 401 in accordance with the circumstances, and a specific example of this will be described here. The learning model is associated, in advance, with a partial image in the training data corresponding to the learning model as a sampled scene image. The geometric information estimating unit 402 evaluates a degree of similarity between the input image and the sampled scene image, and estimates the geometric information using the learning model associated with the sampled scene image having a high evaluation value. A plurality of sampled scene images may be associated with a single learning model.

Although the fourth embodiment described the geometric information estimating unit 402 as selecting an appropriate learning model from among a plurality of learning models held in the learning model holding unit 401 in accordance with the circumstances, the configuration is not limited thereto. For example, the geometric information may be generated for each of a plurality of learning models, and the subsequent processing may be carried out after further generating fourth and fifth geometric information.

Fifth Embodiment

Figure 17:
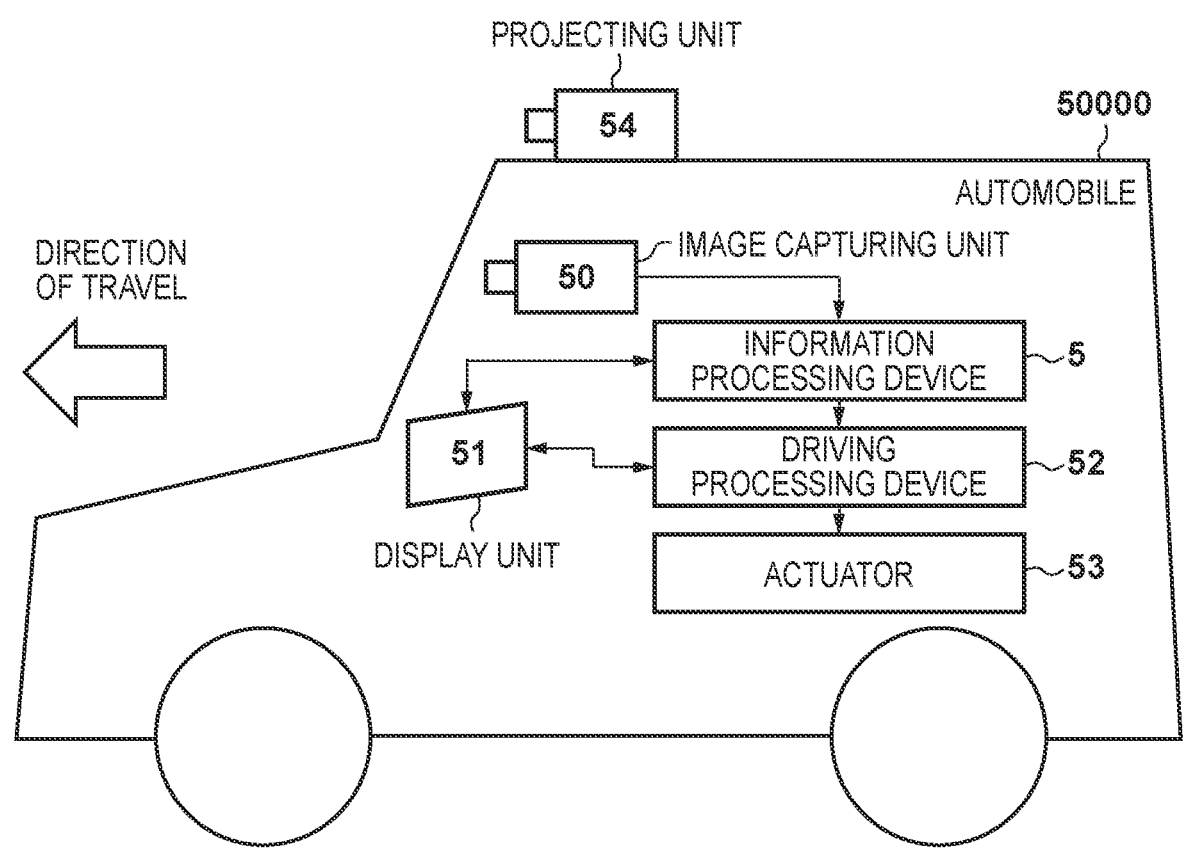
FIG. 17 is a diagram illustrating the configuration of an automobile according to a fifth embodiment.

The first, second, third, and fourth embodiments described stereo-based estimation methods using two image capturing devices as methods for estimating geometric information based on triangulation. As opposed to this, in a fifth embodiment, a projecting unit that projects a predetermined pattern toward a space captured by the image capturing unit is included, and the geometric information is estimated through active stereo implemented by a single image capturing device and the projecting unit. FIG. 17 illustrates the configuration of an automobile according to the present embodiment. In the present fifth embodiment, stable geometric information and a stable position/orientation are found from two systems of geometric information, namely geometric information obtained by active stereo implemented by a projecting unit 54 and an image capturing unit 50 and the geometric information estimated using the learning model already described in the first embodiment, and from the corresponding position/orientation, in order to find the position/orientation of the image capturing unit 50, which is attached to an automobile 50000.

Configuration of Information Processing Device

Figure 18:
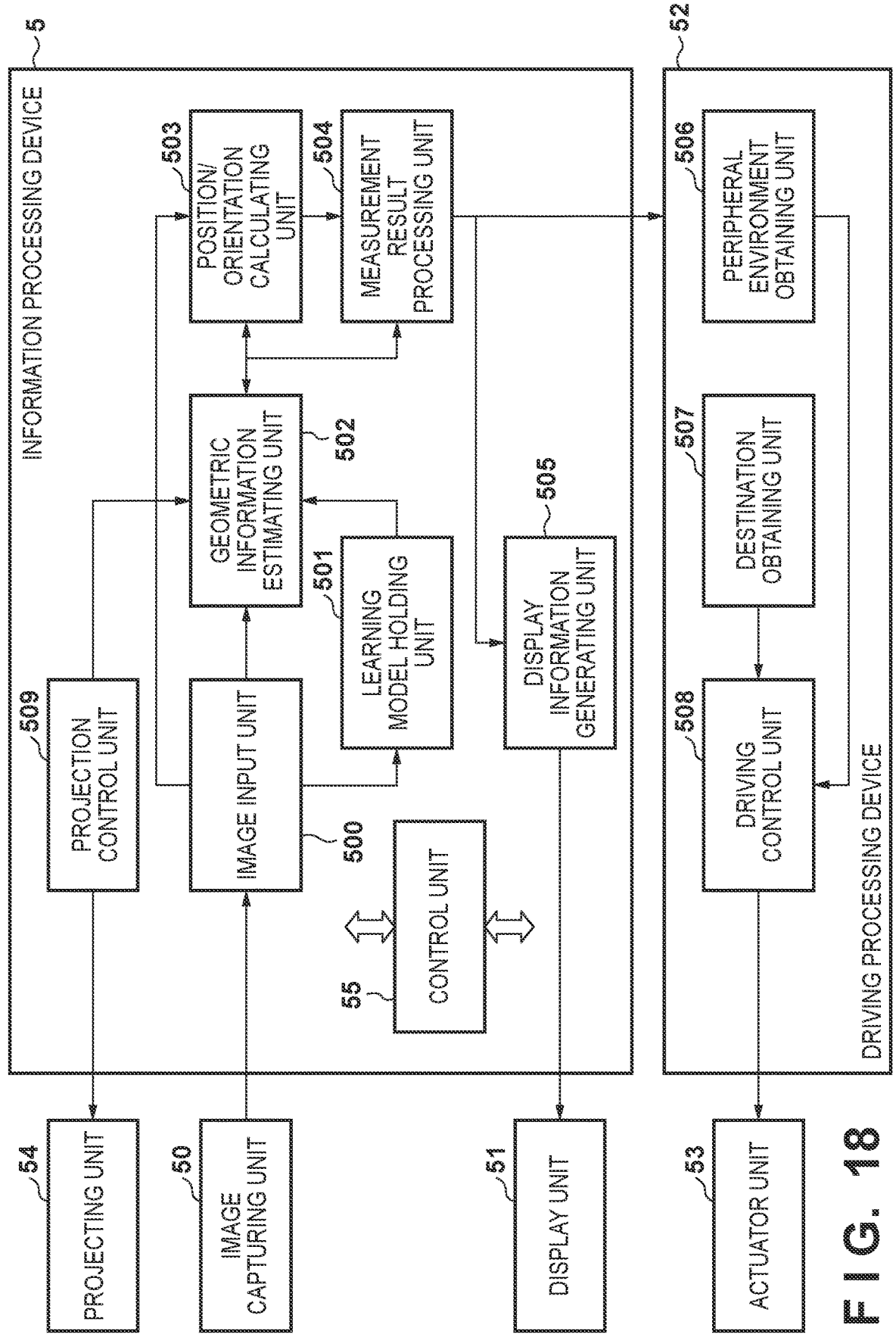
FIG. 18 is a diagram illustrating the functional configuration of an information processing device and a driving processing unit according to the fifth embodiment.

FIG. 18 is a diagram illustrating an example of the functional configuration of an information processing device 5 and a driving processing device 52 according to the present fifth embodiment. The information processing device 5 includes an image input unit 500, a learning model holding unit 501, a geometric information estimating unit 502, a position/orientation calculating unit 503, a measurement result processing unit 504, a display information generating unit 505, a projection control unit 509, and a control unit 55 which controls the device as a whole. The driving processing device 52 includes a peripheral environment obtaining unit 506, a destination obtaining unit 507, and a driving control unit 508 that controls the device as a whole. The image input unit 500, the learning model holding unit 501, the geometric information estimating unit 502, the position/orientation calculating unit 503, the measurement result processing unit 504, the display information generating unit 505, the peripheral environment obtaining unit 506, the destination obtaining unit 507, the driving control unit 508, the image capturing unit 50, a display unit 51, the driving processing device 52, an actuator unit 53, and the control unit 55 correspond to the image input unit 100, the learning model holding unit 101, the geometric information estimating unit 102, the position/orientation calculating unit 103, the measurement result processing unit 104, the display information generating unit 105, the peripheral environment obtaining unit 106, the destination obtaining unit 107, the driving control unit 108, the image capturing unit 10, the display unit 11, the driving processing device 12, the actuator unit 13, and the control unit 15 according to the first embodiment. Descriptions will not be given of functions that are the same, and only the projection control unit 509, the image input unit 500, and the geometric information estimating unit 502, which are different, will be described. The position/orientation calculating unit 503 and the measurement result processing unit 504 are the same as the position/orientation calculating unit 103 and the measurement result processing unit 104 according to the first embodiment, and differ only in that while three systems of geometric information and the position/orientation are handled in the first embodiment, two systems of geometric information and the position/orientation are handled in the present embodiment. Descriptions thereof will thus be omitted. Additionally, it is assumed that the image capturing unit 50 is constituted by a single image capturing device, the position/orientation relationship between the image capturing device of the image capturing unit 50 and the projecting unit 54 is found in advance through calibration, and calibration parameters are held in the calibration parameter holding unit (not shown).

The projection control unit 509 controls projection of patterned light toward an image capturing space of the image capturing unit, and carries out the projection using the projecting unit 54. The projection control unit 509 outputs information pertaining to the projected pattern to the geometric information estimating unit 502.

The image input unit 500 is input with image data of a two-dimensional image of a subject space onto which the pattern has been projected, by the image capturing device of the image capturing unit 50, in time series, and outputs the data to the learning model holding unit 501, the geometric information estimating unit 502, the position/orientation calculating unit 503, the display information generating unit 505, and the driving processing device 52 after processing. The processing carried out by the image input unit 500 is separating the captured image into a first image which has been affected by the projection pattern and a second image which has not been affected by the projection pattern. Specifically, it is assumed that the pattern projected by the projecting unit 54 is infrared light, and the image capturing unit 50 can capture images in two channels, namely visible light and infrared light. The image input unit 500 processes the image in the infrared light channel as the first image and the image in the visible light channel as the second image, and outputs the first image and the second image.

The geometric information estimating unit 502 estimates the first geometric information through active stereo, based on the first image input by the image input unit 500 and information pertaining to the pattern input by the projection control unit 509. Additionally, the geometric information estimating unit 502 uses the learning model held in the learning model holding unit 501 to estimate the second geometric information from the second image input from the image input unit 500. The estimated first and second geometric information are output to the position/orientation calculating unit 103.

Processing

Figure 19:
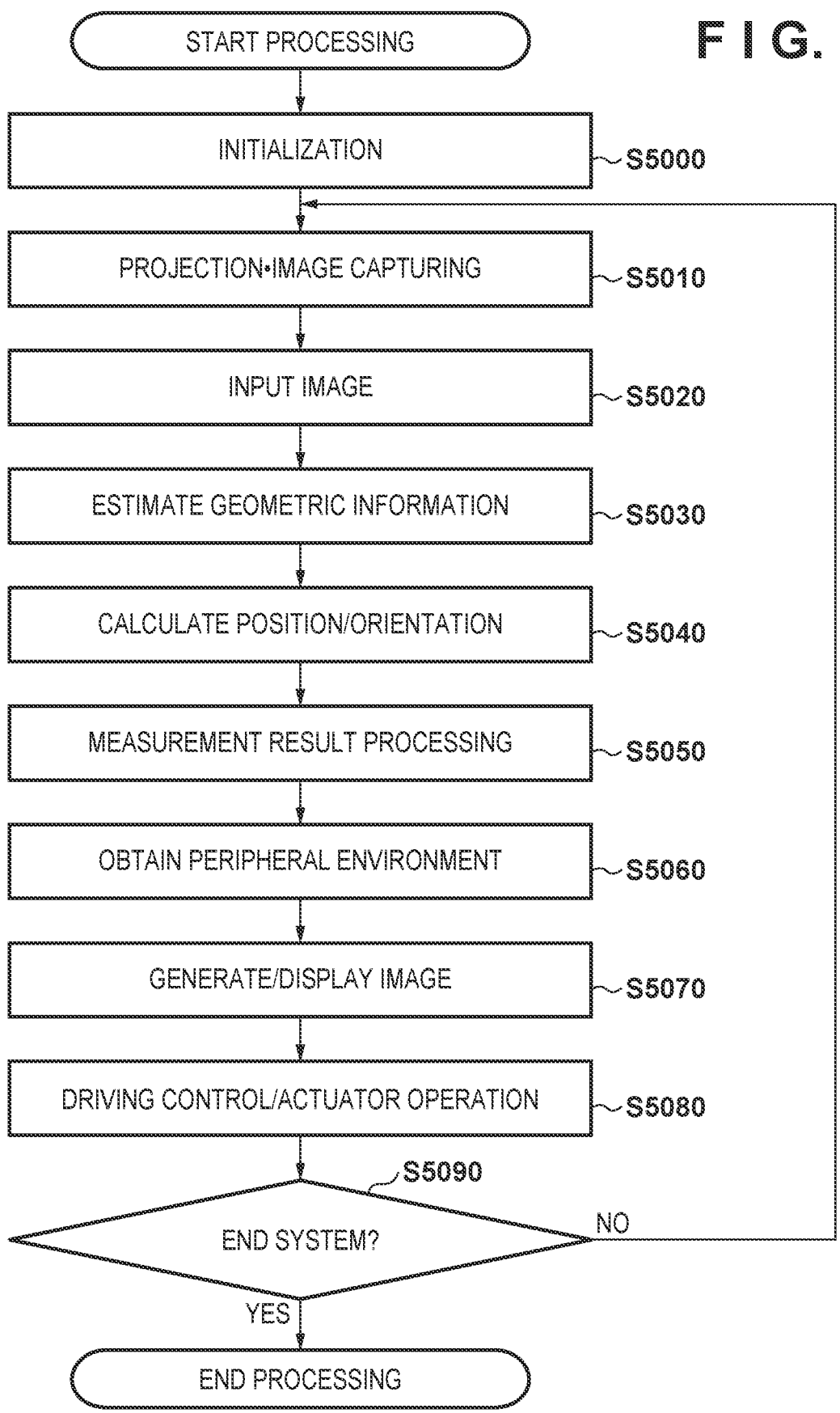
FIG. 19 is a flowchart illustrating a processing sequence carried out by an information processing system according to the fifth embodiment.

A processing sequence according to the present fifth embodiment will be described next. FIG. 19 is a flowchart illustrating a processing sequence carried out by an information processing system including the information processing device 5 according to the present fifth embodiment.

The flowchart according to the present fifth embodiment is substantially the same as the flowchart described in the first embodiment with reference to FIG. 4. Step S5040, step S5050, step S5060, step S5070, step S5080, and step S5090 are the same processing as step S1040, step S1050, step S1060, step S1070, step S1080, and step S1090, respectively, and therefore will not be described. Step S5000, step S5010, step S5020, and step S5030, which are different, will be described below.

In step S5000, the control unit 55 initializes the system. In addition to the processing of step S1000 described in the first embodiment, the control unit 55 also starts up the projecting unit 54 and loads settings for the pattern to be projected by the projection control unit 509.

In step S5010, the control unit 55 controls the projection control unit 509 to project a pattern onto the scene from the projecting unit 54, causes the image capturing device of the image capturing unit 50 to capture an image of the scene, and causes the captured image to be output to the image input unit 500.

In step S5020, the control unit 55 controls the image input unit 500 to obtain the image captured in step S5010 and split that image into the first image and the second image.

In step S5030, the control unit 55 controls the geometric information estimating unit 502 to estimate the first and second geometric information on the basis of the first image and the second image, respectively. The first geometric information is found through active stereo. Specifically, the geometric information estimating unit 502 finds a correspondence relationship between the first image and the projection pattern on the basis of the first image and information of the projection pattern input by the projection control unit 509. Then, the geometric information estimating unit 502 estimates the range image by carrying out triangulation on the basis of calibration parameters from the calibration parameter holding unit (not shown), which express the position/orientation relationship between the image capturing device of the image capturing unit 50 and the projecting unit 54. Additionally, as in the first embodiment, the geometric information estimating unit 502 estimates the second geometric information from the second image using the learning model.

Effects

According to the fifth embodiment as described thus far, a function is provided for estimating the geometric information using active stereo implemented using a projection pattern. As such, the geometric information can be found in a stable manner even for an unknown scene with few features, which increases the safety of autonomous driving or driving assistance.

Variations

Although the fifth embodiment described an example in which the image input unit 500 divides an image into two channels, namely infrared light and visible light, the method for dividing the image into the first image and the second image is not limited thereto. For example, assuming the projecting unit 54 projects the infrared light in a random dot pattern and the image capturing unit 50 can capture a monochromatic image of the infrared light, the captured image may be taken as the first image, and an image which has been blurred using Gaussian blur or filtering so that the effects of the random dot pattern cannot be seen may be taken as the second image. Alternatively, the projecting unit 54 and the image capturing unit 50 may be controlled at high speeds, with an image captured with the projection pattern present taken as the first image, and an image captured with the projection pattern absent taken as the second image.

Although the fifth embodiment described an example in which the image input unit 500 splits the image into the first image and the second image, the configuration is not limited thereto. For example, the processing for splitting the image may first be carried out by the geometric information estimating unit 502, the position/orientation estimating unit 503, the measurement result processing unit 504, or the like, and a single image may then be input to the image input unit 500.

Although the fifth embodiment described the pattern projected by the projection control unit 509 as being a random dot pattern, the projection pattern is not limited thereto. For example, the projection pattern may be a grid pattern, or, if projecting and image capturing can be carried out at high speeds, the geometric information may be estimated from a plurality of projection pattern captured images by using phase-shifted patterns or a Gray code pattern.

Although the fifth embodiment described the calculation result processing of step S5050 as being carried out after the position/orientation is calculated, the configuration is not limited thereto. As in the variation on the first embodiment and the variation on the second embodiment, the calculation result processing may be carried out after the geometric information estimation to find one piece of the geometric information, and the position/orientation calculation may then be carried out.

Although the processing sequence in the fifth embodiment is described as being substantially identical to that of the first embodiment, the sequence is not limited thereto. The first geometric information and the second geometric information may be switched as appropriate by carrying out processing that is the same as in the second embodiment. This makes it possible to carry out the processing even with relatively small-scale computational resources.

Although the processing sequence in the fifth embodiment is described as being substantially identical to that of the first embodiment, the sequence is not limited thereto. By carrying out the same processing as in the third embodiment, even if there is a problem, measures are taken in order to eliminate the problem, which makes it possible to continuously operate the system in a more safe and stable manner.

Although the processing sequence in the fifth embodiment is described as being substantially identical to that of the first embodiment, the sequence is not limited thereto. By carrying out the same processing as in the fourth embodiment, the position/orientation can be estimated stably, and the autonomous driving or driving assistance can be carried out more safely, by generating a learning model, even for scenes in which the geometric information could not be estimated using an existing learning model.

Although the fifth embodiment described an example in which the projecting unit 54 only fills the role of projecting a pattern onto a captured scene, the configuration is not limited thereto. For example, the projecting unit 54 may be provided with the functions of the display unit 51 as well, and may project a display to the user. The projecting unit 54 may be used as a headlight of the automobile 50000 as well. Alternatively, a headlight (not shown) may be provided with the functions of the projecting unit 54.

In the fifth embodiment, the projecting unit 54 may modulate the projected pattern so that the specific pattern can be identified even when other light sources, other projection patterns, and so on are present. Accordingly, even if multiple automobiles having the same function are present near one another, the projection patterns will not interfere with one another, and the geometric information can be estimated in a stable manner.

The fifth embodiment described an example in which the projecting unit 54 is constituted by a single projection device and the image capturing unit 50 is constituted by a single image capturing device. The embodiment is not limited thereto, however. For example, a plurality of projection devices and a plurality of image capturing devices may be provided. In this case, three or more pieces of geometric information, position/orientations, and so on can be found. Additionally, the processing may be carried out using only some of those many pieces of information. Through this, the estimation is carried out using many pieces of geometric information, position/orientations, and so on, which makes it possible to find the geometric information, the position/orientation, and so on in a more robust and accurate manner.

According to the present invention, position/orientation estimation which is robust with respect to problems in an image capturing device can be carried out.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing device that, on the basis of an image from an image capturing unit including a first image capturing device and a second image capturing device disposed so that image capturing visual fields of the image capturing devices at least partially overlap, finds a position/orientation of the image capturing unit or range information representing a three-dimensional shape of a scene that has been captured by a captured image, the information processing device comprising:
   an input unit that inputs, from the image capturing unit, a first image obtained by the first image capturing device and a second image obtained by the second image capturing device;
   a holding unit including at least one memory that holds a learning model that estimates range information expressed by a provided image;
   a first estimating unit that estimates first provisional range information from the first image and the second image;
   a second estimating unit that estimates second provisional range information on the basis of the first image and the learning model held in the holding unit;
   a third estimating unit that estimates third provisional range information on the basis of the second image and the learning model held in the holding unit; and
   a generating unit that, on the basis of the first, second, and third provisional range information, generates at least one of position/orientation information of the image capturing unit and the range information expressed by the image captured by the image capturing unit,
   wherein the information processing apparatus includes at least one processor configured to execute instructions causing the information processing apparatus to function as the input unit, the first, second, and third estimating units, and the generating unit.

2. The information processing device according to claim 1, wherein the generating unit includes:
   a first calculating unit that calculates a first provisional position/orientation of the image capturing unit on the basis of the first provisional range information;
   a second calculating unit that calculates a second provisional position/orientation of the image capturing unit on the basis of the second provisional range information;
   a third calculating unit that calculates a third provisional position/orientation of the image capturing unit on the basis of the third provisional range information; and
   a processing unit that, on the basis of at least one of the first, second, and third provisional position/orientation, carries out processing for outputting the position/orientation of the image capturing unit.

3. The information processing device according to claim 1, wherein the generating unit generates the range information expressed by an image captured by an image capturing device to serve as a reference in the image capturing unit, on the basis of the first, second, and third provisional range information.

4. The information processing device according to claim 1, wherein the generating unit includes:
   an output unit that outputs one of the first, second, and third provisional range information as provisional range information of the image capturing unit;
   a determining unit that determines whether the provisional range information output by the output unit is proper or improper; and
   a setting unit that, when the determining unit has determined that the provisional range information is improper, sets other provisional range information to be output by the output unit.

5. The information processing device according to claim 1, wherein the generating unit calculates the position/orientation of the image capturing unit on the basis of the generated range information and updates the range information.

6. The information processing device according to claim 1, further comprising
   a detecting unit that detects an abnormality pertaining to the image capturing unit or the range information on the basis of the range information or the position/orientation.

7. The information processing device according to claim 6, further comprising
   a calibration calculating unit that carries out calibration between the first and second image capturing devices of the image capturing unit on the basis of the second and third provisional range information,
   wherein the calibration calculating unit carries out the calibration when the detecting unit has detected an abnormality in the calibration between the first image capturing device and the second image capturing device.

8. The information processing device according to claim 6, wherein, when the detecting unit has detected that an abnormality has arisen in the first provisional range information, the generating unit generates the position/orientation on the basis of at least one of the second and third provisional position/orientation.

9. The information processing device according to claim 6, wherein, when the detecting unit has detected that an abnormality has arisen in the first provisional range information, the generating unit generates the range information on the basis of at least one of the second and third provisional range information.

10. The information processing device according to claim 6, further comprising a training unit that trains a model to be held in the holding unit on the basis of the range information.

11. The information processing device according to claim 10, wherein, when the detecting unit has detected that an abnormality has arisen in the second and third provisional range information, the training unit obtains additional training data for use in the training.

12. An information processing device that, on the basis of an image from an image capturing unit including an image capturing device, finds a position/orientation of the image capturing unit or range information representing a three-dimensional shape of a scene that has been captured by a captured image, the information processing device comprising:
   a projecting unit that projects a predetermined pattern toward a space that is to be captured by the image capturing device;
   an input unit that inputs, from the image capturing unit, a first image that has been affected by the pattern from the projecting unit and a second image that has not been affected by the projection of the pattern;

a holding unit including at least one memory that holds a learning model that estimates, on the basis of a provided image, range information expressed by the image;

a first estimating unit that, on the basis of the first image, estimates first provisional range information expressed by the first image;

a second estimating unit that estimates second provisional range information on the basis of the second image and the learning model held in the holding unit; and a generating unit that, on the basis of the first and second provisional range information, generates at least one of position/orientation information of the image capturing unit and range information expressed by the image captured by the image capturing unit, wherein the information processing apparatus includes at least one processor configured to execute instructions causing the information processing apparatus to function as the input unit, the first, second, and third estimating units, and the generating unit.

13. The information processing device according to claim 12, wherein, the projecting unit projects a pattern of infrared light, and wherein the input unit inputs a component of the infrared light in the image captured by the image capturing unit as the first image, and inputs a component of visible light as the second image.

14. A control method for an information processing device, the information processing device including an image capturing unit having a first image capturing device and a second image capturing device disposed so that image capturing visual fields of the image capturing devices at least partially overlap, and a holding unit that includes at least one memory and holds a learning model for estimating range information representing a three-dimensional shape of a scene expressed by a provided image, the method comprising:

(a) inputting, from the image capturing unit, a first image obtained by the first image capturing device and a second image obtained by the second image capturing device;

(b) estimating first provisional range information from the first image and the second image;

(c) estimating second provisional range information on the basis of the first image and the learning model held in the holding unit;

(d) estimating third provisional range information on the basis of the second image and the learning model held in the holding unit; and (e) on the basis of the first, second, and third provisional range information, generating at least one of position/orientation information of the image capturing unit and range information expressed by the image captured by the image capturing unit.

15. A non-transitory computer-readable storage medium storing a program executed by a computer, the computer including an image capturing unit having a first image capturing device and a second image capturing device disposed so that image capturing visual fields of the image capturing devices at least partially overlap, and a holding unit that includes at least one memory and holds a learning model for estimating range information representing the three-dimensional shape of a scene expressed by a provided image, the program causing the computer to execute:

(a) inputting, from the image capturing unit, a first image obtained by the first image capturing device and a second image obtained by the second image capturing device;

(b) estimating first provisional range information from the first image and the second image;

(c) estimating second provisional range information on the basis of the first image and the learning model held in the holding unit;

(d) estimating third provisional range information on the basis of the second image and the learning model held in the holding unit; and (e) on the basis of the first, second, and third provisional range information, generating at least one of position/orientation information of the image capturing unit and range information expressed by the image captured by the image capturing unit.

16. A driving control system, comprising:

the information processing device according to claim 1;

a driving control unit that controls driving on the basis of information generated by the generating unit of the information processing device; and an actuator unit that is operated by the driving control unit.

17. An information processing device that, on the basis of an image captured by an image capturing unit including a first image capturing device and a second image capturing device disposed on a moving body so that image capturing visual fields of the image capturing devices at least partially overlap, finds position information of the image capturing unit, the information processing device comprising:

an input unit that inputs, from the image capturing unit, a first image obtained by the first image capturing device and a second image obtained by the second image capturing device;

an estimating unit that estimates first range information that is range information indicating a three-dimensional shape of a captured scene on the basis of the first image and the second image, estimates second range information on the basis of the first image and a learning model, held in at least one memory, for estimating range information expressed by a provided image, and estimates third range information on the basis of the second image and the learning model; and a generating unit that generates the position information of the image capturing unit in the scene on the basis of the first range information, the second range information, and the third range information, wherein the information processing apparatus includes at least one processor configured to execute instructions causing the information processing apparatus to function as the input unit, the third estimating unit, and the generating unit.

18. The information processing device according to claim 17, wherein the generating unit generates the position information of the image capturing unit from range information obtained by weighting the first geometric range information, the second range information, and the third range information with reliabilities and integrating the first range information, the second range information, and the third range information.

19. The information processing device according to claim 17, wherein the generating unit calculates first position information of the image capturing unit from the first range information, second position information of the image capturing unit from the second range information, and third position information of the image capturing unit from the third range information, and then generates the position information of the image capturing unit by weighting the first position information, the second position information, and the third position information with reliabilities.

20. The information processing device according to claim 17, wherein the generating unit generates the position information of the image capturing unit using any one piece of range information among the first range information, the second range information, and the third range information, and if a reliability has decreased, generates the position information of the image capturing unit using a different piece of the range information.

21. An information processing device that, on the basis of an image from an image capturing unit including a first image capturing device and a second image capturing device disposed so that image capturing visual fields of the image capturing devices at least partially overlap, finds a position/orientation of the image capturing unit or range information representing a three-dimensional shape of a scene that has been captured expressed by a captured image, the information processing device comprising:

an input unit that inputs, from the image capturing unit, a first image obtained by the first image capturing device and a second image obtained by the second image capturing device;

a holding unit including at least one memory that holds a learning model that estimates the range information expressed by a provided image;

a first estimating unit that estimates first provisional the range information from the first image and the second image;

a second estimating unit that estimates second provisional the range information on the basis of the first image and the learning model held in the holding unit; and a generating unit that, on the basis of the first and second provisional range information, generates at least one of position/orientation information of the image capturing unit and the range information expressed by the image captured by the image capturing unit, wherein the information processing device includes at least one processor configured to execute instructions causing the information processing device to function as the input unit, the first and second estimating units, and the generating unit.

* * * * *